United States Patent [19]
Maucher et al.

[11] Patent Number: 5,318,162
[45] Date of Patent: Jun. 7, 1994

[54] RELEASE APPARATUS FOR PULL-TYPE FRICTION CLUTCHES

[75] Inventors: Paul Maucher, Sasbach; Michael Schmurr, Ottenhöfen, both of Fed. Rep. of Germany

[73] Assignee: Luk Lamellen und Kupplungsbau GmbH, Bühl, Fed. Rep. of Germany

[21] Appl. No.: 931,296

[22] Filed: Aug. 17, 1992

[30] Foreign Application Priority Data

Aug. 17, 1991 [DE] Fed. Rep. of Germany ....... 4127286
Aug. 19, 1991 [DE] Fed. Rep. of Germany ....... 4127188

[51] Int. Cl.⁵ ............................................. F16D 23/14
[52] U.S. Cl. .................................. 192/91 A; 192/98; 192/110 B; 192/89.24
[58] Field of Search ................. 192/91 A, 98, 89 PL, 192/110 B

[56] References Cited

U.S. PATENT DOCUMENTS

| | | | |
|---|---|---|---|
| 4,482,041 | 11/1984 | Ladin | 192/110 B X |
| 4,506,774 | 3/1985 | Block | 192/110 B X |
| 4,632,237 | 12/1986 | Maycock et al. | 192/98 |
| 4,646,898 | 3/1987 | Muller | 192/98 |
| 4,691,815 | 9/1987 | Maycock et al. | 192/98 |
| 4,700,821 | 10/1987 | Maucher | 192/106.2 |
| 4,700,822 | 10/1987 | Maucher | 192/106.2 |
| 4,733,762 | 3/1988 | Gay et al. | 192/98 |
| 4,733,763 | 3/1988 | Gay et al. | 192/98 |
| 4,778,039 | 10/1988 | Eliasson | 192/85 CA |
| 4,788,343 | 4/1988 | Maucher | 192/70.13 |
| 4,881,629 | 11/1989 | Gay et al. | 192/110 B X |
| 4,903,807 | 2/1990 | Kabayama et al. | 192/98 |
| 4,947,975 | 8/1990 | Tojima | 192/98 |
| 4,967,891 | 11/1990 | Takeuchi | 192/98 |
| 5,014,840 | 5/1991 | Tojima | 192/98 |
| 5,111,924 | 5/1992 | Reik | 192/70.17 |
| 5,201,393 | 4/1993 | Takeuchi et al. | 192/98 X |

FOREIGN PATENT DOCUMENTS

| | | |
|---|---|---|
| 0044691 | 1/1982 | European Pat. Off. . |
| 0164871 | 12/1985 | European Pat. Off. . |
| 2613952 | 11/1985 | Fed. Rep. of Germany . |
| 3539889 | 4/1987 | Fed. Rep. of Germany . |
| 2639766 | 4/1989 | Fed. Rep. of Germany . |
| 2540585 | 8/1984 | France . |
| 2588337 | 4/1987 | France . |

*Primary Examiner*—Leslie A. Braun
*Assistant Examiner*—Andrea Pitts
*Attorney, Agent, or Firm*—Darby & Darby

[57] ABSTRACT

A release apparatus for a pull-type friction clutch wherein the coupling between the parts on the engine and the parts on the power train of a motor vehicle is automatically deactivated in response to separation of the engine from the power train, and is automatically reestablished during reassembly of the engine with the power train. The coupling employs a detent in the form of a resilient split wire ring which is carried by the parts on the engine or by the parts on the power train, and a complementary undercut member which is carried by the parts on the power train or by the parts on the engine and form-lockingly engages the detent when the two sets of parts assume predetermined axial positions relative to each other. A releasing device is provided on one set of parts to depress the detent into a socket in response to movement of the engine and the power train away from each other to thus deactivate the coupling.

54 Claims, 13 Drawing Sheets

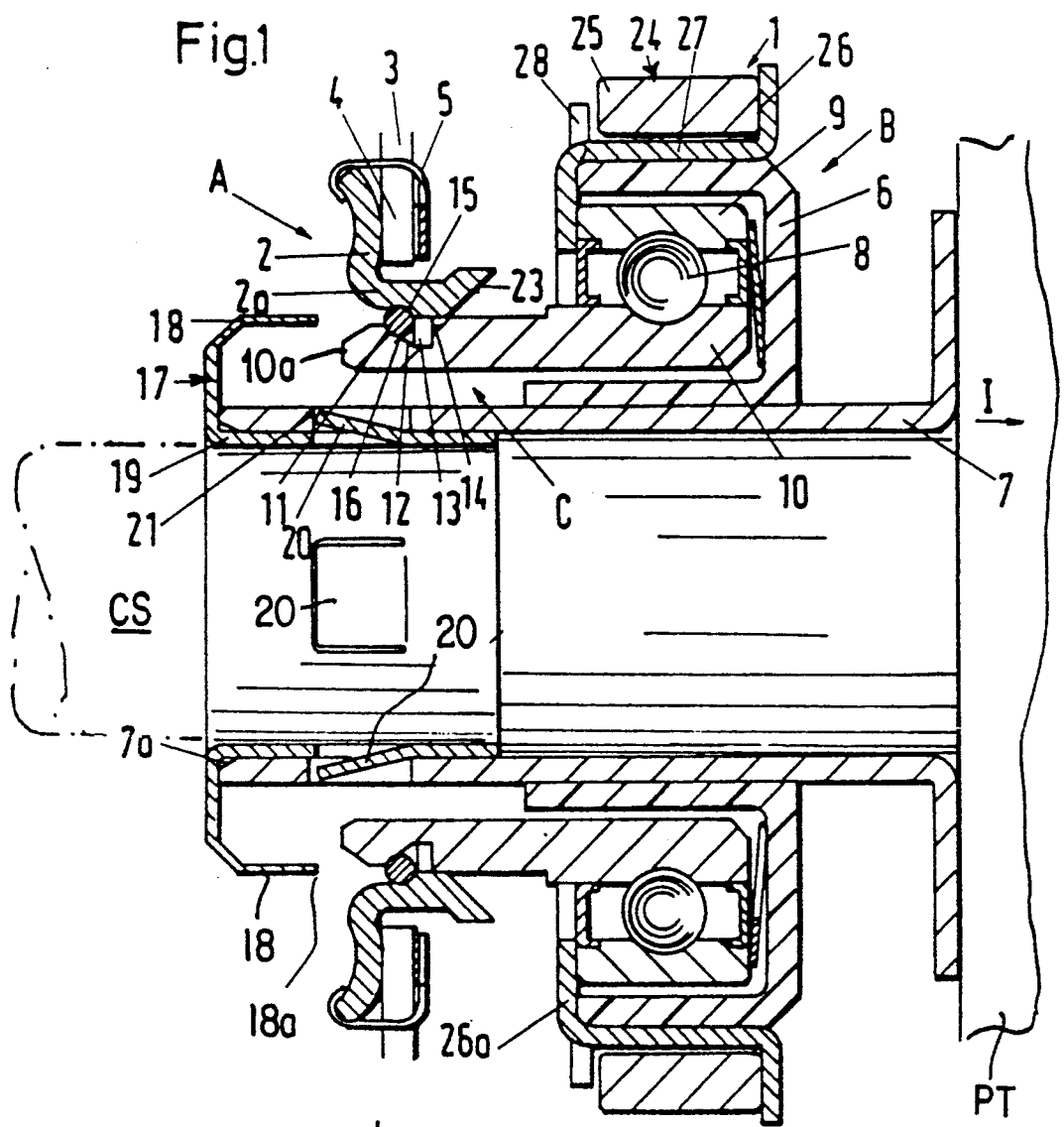

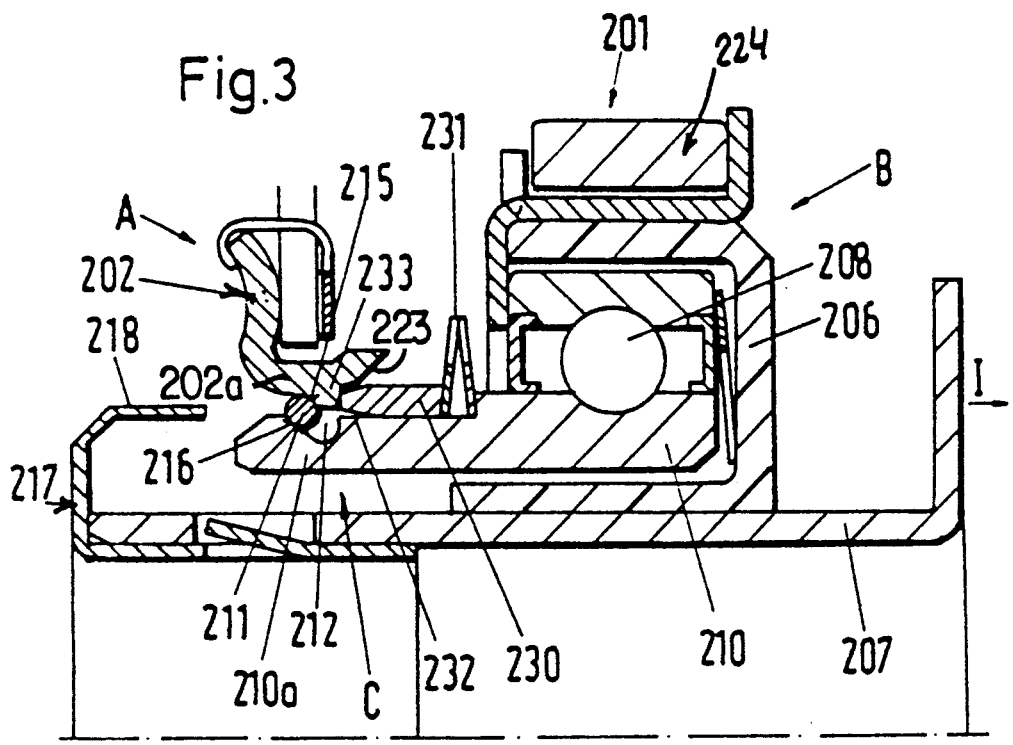
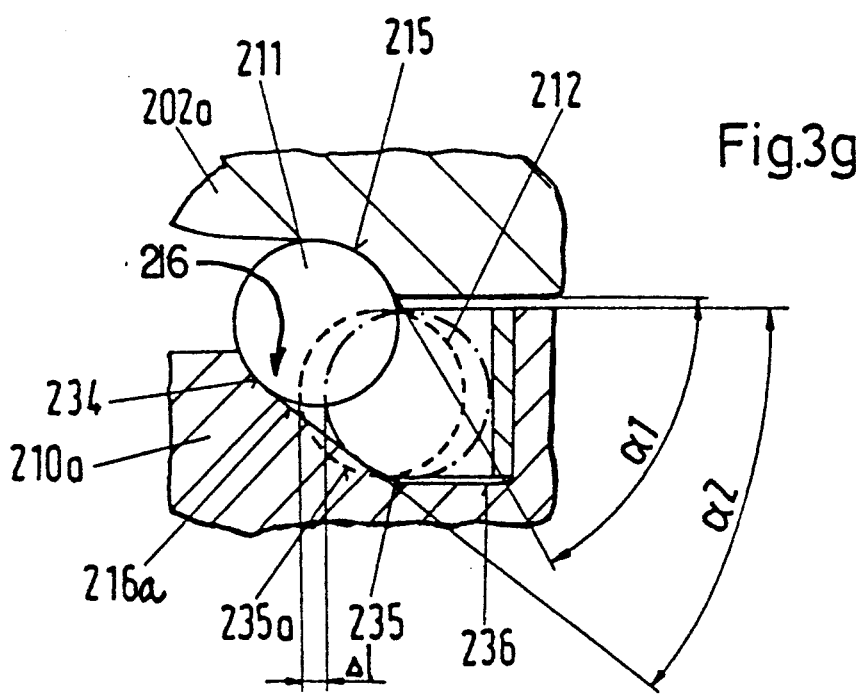

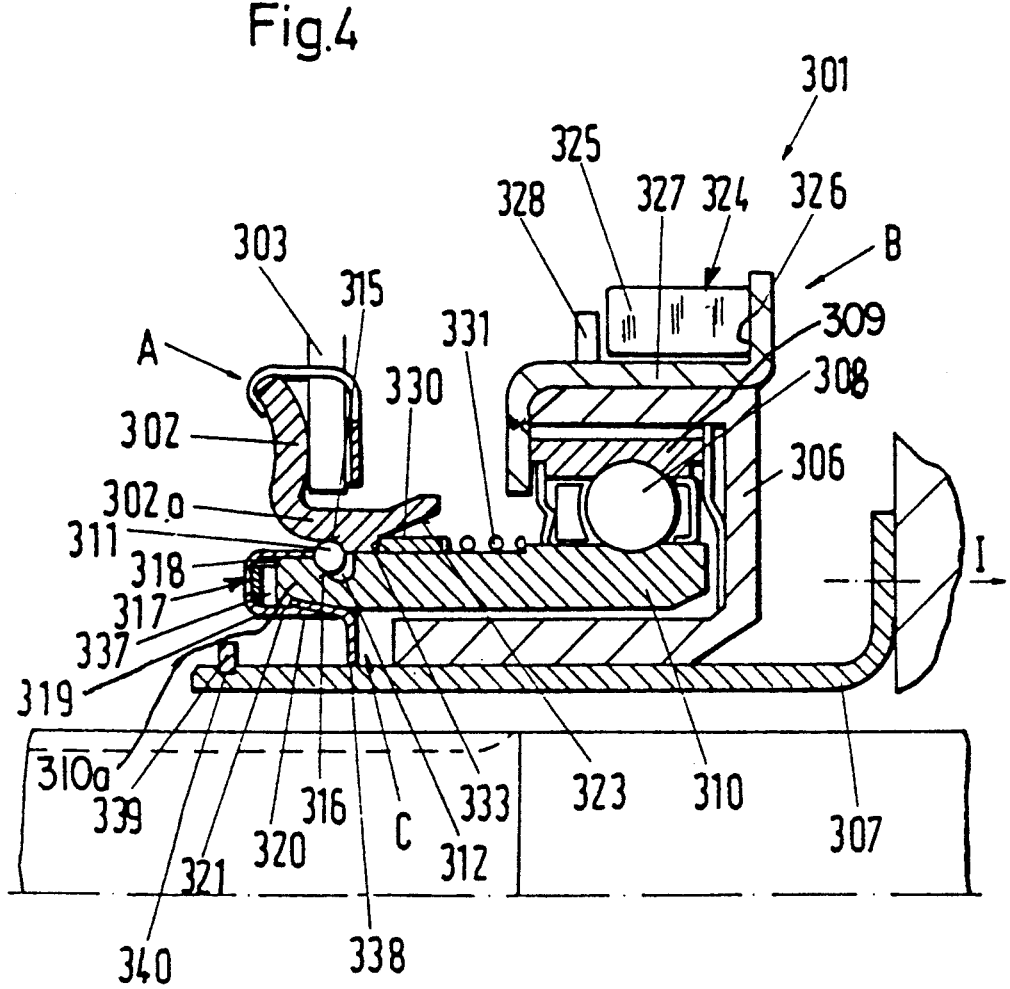

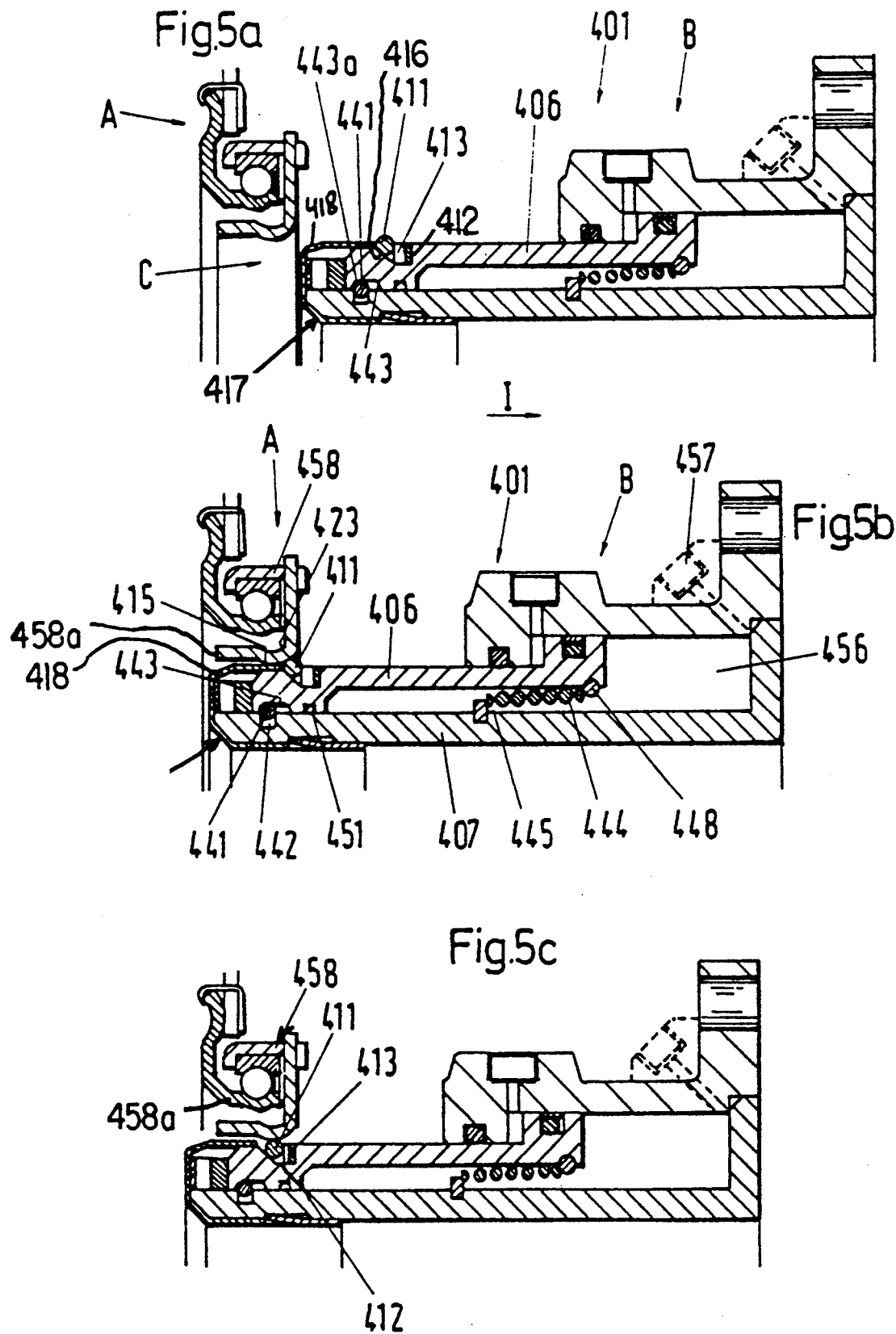

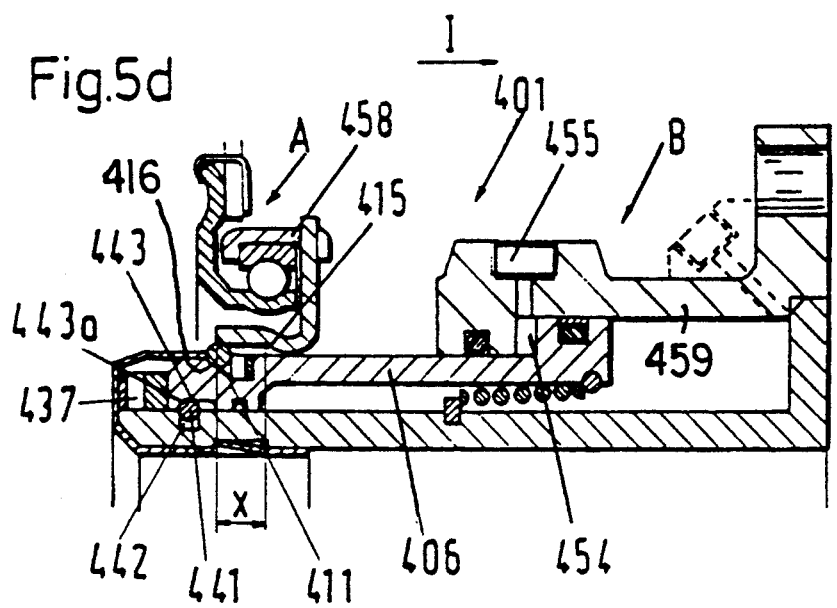
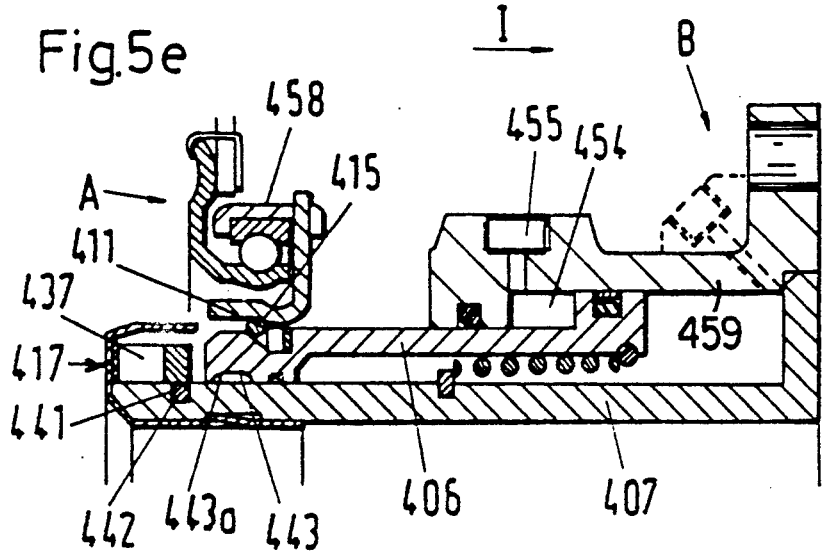
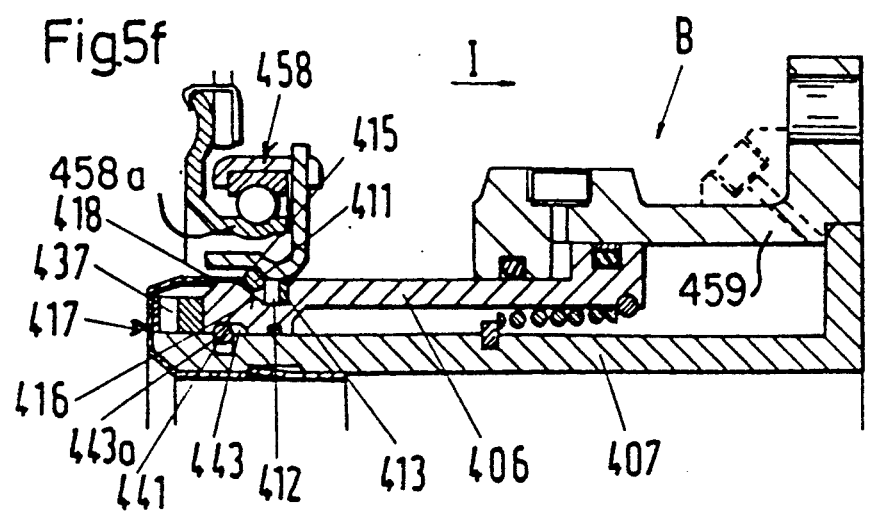

RELEASE APPARATUS FOR PULL-TYPE FRICTION CLUTCHES

BACKGROUND OF THE INVENTION

The invention relates to improvements in so-called pull-type friction clutches. A pull-type clutch is constructed and assembled in such a way that it is disengaged to interrupt the transmission of torque between its input and output elements by pulling the clutch engaging/disengaging part or parts in a direction away from the clutch disc or clutch plate and against the resistance of one or more springs or other biasing means. In many pull-type friction clutches, the clutch engaging/disengaging means and the biasing means constitute a single part, particularly a diaphragm spring. The prongs of the diaphragm spring are affixed to a connecting device, such as a dished or disc-shaped element, which must be subjected to a pull in order to disengage or deactivate the friction clutch. The radially outer portion of the diaphragm spring engages the cover or another part of the friction clutch, and a radially inner portion of the diaphragm spring engages an axially moveble pressure plate of the friction clutch. The situation is analogous in so-called lever-actuated pull-type friction clutches wherein the biasing means and the engaging/disengaging means constitute separate parts.

Pull-type friction clutches exhibit a number of important advantages over the so-called push-type friction clutches. However, when a conventional pull-type friction clutch is used in a motor vehicle to serve as a means for establishing or interrupting a torque transmitting connection between the output element (e.g., a crankshaft) of an internal combustion engine and the input element of a power train (such as the input shaft of a variable-speed transmission), the establishment and interruption of an operative connection between the engine and the power train are much more complicated than in the case of a push-type friction clutch.

German Pats. Nos. 26 13 952 and 26 39 766 propose the establishment of a connection between a pull-type friction clutch on the one hand, and the engine and the power train of a motor vehicle on the other hand. The power train carries a guide member which can be tracked by an axially movable follower. An antifriction bearing is installed between the clutch disengaging means (constituted by the prongs of a diaphragm spring) and the follower. The bearing has a first race which rotates with the diaphragm spring and a second race which does not rotate and is mounted on the follower. The patented pull-type friction clutches further comprise at least one connector between the disengaging means and the guide member. The latter is an elongated tube which is carried by the power train, and the follower is a sleeve which is shiftable along the tube by a forked actuator. The patents also propose to employ a follower which constitutes the piston of a hydraulic motor whose cylinder constitutes the guide member.

The means for connecting the engine with the power train comprises at least one male coupling member which can be caused to penetrate into a recess or space and to engage a retaining member which cooperates with the male coupling member to prevent separation of first clutch components on the engine from second clutch components on the power train. The first components can be mounted on the engine, and the second components can be mounted on the power train before such first and second components are coupled to each other. The male coupling member can comprise a split ring, one or more spherical parts or one or more spreadable jaws or claws, and this coupling member is constructed and mounted in such a way that it automatically engages the retaining member or members in response to movement of the engine and power train to predetermined positions relative to each other or in response to the application of an external force, such as by the forked actuator of the clutch disengaging means. The aforementioned patents fail to disclose or suggest a system which would facilitate repeated rapid and convenient separation of the engine and the power train from each other or repeated rapid and convenient reconnection of the engine and of the power train to one another.

A modified system for assembling a pull-type friction clutch between an engine and a power train is disclosed in published French patent application No. 2 588 337 and in published European patent application No. 0 164 871. The engine and the power train can be automatically coupled to each other in a manner as disclosed in the aforediscussed German patents. The connecting or coupling means comprises a ring which can be caused to snap into a groove or recess. The disengagement or uncoupling can be carried out automatically and involves axial movement of a sleeve in a direction counter to that which is required to disengage the friction clutch. Otherwise stated, uncoupling of the engine from the power train must be preceded by a movement of the sleeve in the direction of movement of the sleeve in response to wear upon the friction linings and/or other parts of the clutch plate which is installed between the flywheel and the pressure plate of the friction clutch. This entails a number of serious drawbacks. For example, if the force which is applied to connect the engine with the power train (such force must be applied in the direction of the application of force to disengage the assembled friction clutch), the parts to be connected to each other are likely to advance beyond their intended positions with the result that the actual coupling is immediately followed by uncoupling. The published French patent application proposes a coupling which can be used to reconnect immediately following disconnection without any interference from the outside. However, such interference is necessary in accordance with the proposal which is disclosed in the published European patent application. Thus, if the connection between the clutch components on the engine and the clutch components on the power train is interrupted, the engine and the power train must be fully separated from each other prior to reestablishment of a connection between the two sets of components. Unintentional separation can take place in the motor vehicle while the vehicle is in actual use, for example, as a result of pronounced vibrations and/or other undesirable stray movements. This can result in excessive movement of certain parts between the two sets of clutch components beyond their operative positions (as seen in the direction of engagement of the friction clutch). Such excessive movement can also take place when the clutch pedal is permitted to perform certain snap-type movements or when the foot of the operator happens to slip off the clutch pedal. The inertia of those parts which are caused to move as a result of the just described improper or unintended manipulation of the clutch pedal is likely to cause excessive movements of the coupling elements beyond their optimal positions to thus initiate accidental uncoupling of clutch components on the engine from the clutch components on the power train. The consequences of accidental uncoupling are or can be so serious that the just described pull-type friction clutches have failed to gain acceptance in the relevant industries.

A further mode of installing a pull-type friction clutch between the engine and the power train of a motor vehicle is disclosed in published European patent application No. 0 044 691, in published French patent application No. 2 540 585 and in published German patent application No. 35 39 889. A tubular guide is employed to effect radial displacements of coupling elements in response to movement of the engine and the power train relative to each other. The coupling elements are connected to each other in response to movement of the engine and the power train nearer to one another, and the connection between the coupling elements is interrupted when the engine and the power train move apart. A drawback of the just outlined proposals is that the parts to be connected to one another must assume accurately determined positions of axial alignment with one another. At the same time, the engine and the power train must be moved with reference to each other. The forked disengaging element and one group of components must be moved against the other group of components and must be maintained in accurately determined positions in order to ensure that the coupling elements can actually and properly engage one another. If the movements are not completed with a very high degree of accuracy, the aforementioned tubular member prevents the movements of the engine and the power train toward each other, and the application of additional force can result in damage to parts of the engine, power train and/or friction clutch. Another drawback of the just discussed proposals is that the forked actuator must perform large pivotal movements in order to shift the components to be coupled sufficiently close to each other before the engine and the power train are moved toward one another. As a rule, there is no room for such extensive pivotal movements of the fork. An additional drawback of the systems which are disclosed in the European patent application No. 0 044 691 and in the French patent application 2 540 585 is that the coupling elements engage the tubular guide during uncoupling of the engine from the power train; this results in the development of extensive friction and pronounced wear.

U.S. Pat. No. 4,778,039 granted Oct. 18, 1988 to Thomas Eliasson for "Friction clutch having premounted release bearing and premounted release mechanism" discloses a cylinder housing for an annular sleeve-like piston. A clutch release bearing carries a lock ring for attachment to a diaphragm spring before the engine and the gearbox are coupled to each other. The cylinder housing, the piston and a supporting tube for the piston are secured to the gearbox. The coupling mechanism is installed between the piston and the supporting tube. Prior to coupling of the gearbox to the engine, the piston is moved to a fully retracted position and is arrested in such position by a sleeve in cooperation with two stops. At such time, the sleeve is held on the supporting tube in a predetermined axial position by being confined between the two stops. When the connection of the engine and the gearbox to each other is completed, the piston is displaced from the retracted position in response to admission of a pressurized fluid into a chamber of the cylinder housing whereby the sleeve advances into a space within an annulus of rollers to push the rollers radially outwardly and to thus permit a wire ring to couple a flange to a shoulder. The sleeve continues to move axially in response to admission of additional fluid into the cylinder chamber to complete the establishment of a connection between the piston and the disengaging means. The connection between such parts remains intact as long as the engine and the gearbox remain connected to each other. During dismantling, i.e., during movement of the engine and the gearbox away from each other, the clutch release bearing remains attached to the diaphragm spring and causes the wire ring to pull the piston back to its retracted position. In the next step, one of the stops moves the sleeve away from the space within the rolling elements so that these elements can move radially inwardly, together with the wire ring, to thus complete the separation of clutch components on the engine from clutch components on the gearbox.

A drawback of the proposal of Eliasson is that uncoupling of the two halves of the friction clutch cannot be immediately followed by reconnection of such parts. The reason is that the one stop cannot reassume its original position and, therefore, the sleeve is also incapable of moving back to the locking position. The reestablishment of a proper connection between the two sets of parts is possible only by fully separating the engine from the gearbox and by thereafter fully dismantling the cylinder housing and the supporting tube.

OBJECTS OF THE INVENTION

An object of the invention is to provide a novel and improved release apparatus for a pull-type clutch.

Another object of the invention is to provide provide a novel and improved pull-type friction clutch for use in motor vehicles.

A further object of the invention is to provide a novel and improved system for coupling separable units of a pull-type friction clutch to each other.

An additional object of the invention is to provide a novel and improved coupling between a first unit of a pull-type friction clutch which is mounted on a prime mover and a second unit of the clutch which is mounted on the power train of a motor vehicle.

Still another object of the invention is to provide a coupling which can be operated as often as necessary to connect the units of a pull-type friction clutch to each other or to separate the units from one another.

A further object of the invention is to provide a pull-type friction clutch which does not exhibit the aforediscussed drawbacks of conventional pull-type friction clutches.

Another object of the invention is to provide a friction clutch wherein the establishment of a connection between the two units does not necessitate movements of any parts through considerable distances.

An additional object of the invention is to provide a novel and improved combination of an engine, a power train and a pull-type friction clutch for use in a motor vehicle.

Still another object of the invention is to provide a novel and improved method of automatically establishing and automatically terminating a connection between those units of a pull-type friction clutch which are mounted on the engine and on the prime mover.

A further object of the invention is to provide a friction clutch wherein the connection between the two units cannot be interrupted or terminated when the motor vehicle is in use, for example, as a result of excessive vibratory and/or other stray movements and/or as a result of inappropriate manipulation of the clutch pedal.

Another object of the invention is to provide a pull-type friction clutch whose units can be coupled to or uncoupled from each other without necessitating any, even partial, dismantling of the engine and/or of the power train.

An additional object of the invention is to provide a friction clutch which can be assembled or taken apart with a minimal amount of wear and which can be installed in existing motor vehicles as a superior substitute for conventional pull-type friction clutches.

Still another object of the invention is to provide a coupling which comprises a small number of relatively simple parts and can reliably but separably connect the units of a pull-type friction clutch to each other.

A further object of the invention is to provide a coupling which operates satisfactorily even though the parts on which its constituents are mounted are not compelled to move along accurately determined paths.

Another object of the invention is to provide a novel and improved method of rapidly and repeatedly connecting and disconnecting the engine and the power train of a motor vehicle wherein the friction clutch between the output element (such as a crankshaft) of the internal combustion engine and the input element of the power train (such as the input shaft of the variable-speed transmission) is a pull-type clutch.

An additional object of the invention is to provide a pull-type friction clutch with novel and improved means for releasably coupling the parts including the clutch engaging and disengaging components with the parts including the actuator for the engaging/disengaging components.

Still another object of the invention is to provide novel and improved means for interrupting or terminating the connection between the aforediscussed units of a pull-type friction clutch.

SUMMARY OF THE INVENTION

One feature of the present invention resides in the provision of a clutch release apparatus for a pull-type friction clutch between a prime mover (such as an engine in a motor vehicle) and a power train (such as a variable-speed transmission of a motor vehicle). The release apparatus comprises a first unit which is connectable to the prime mover, a second unit which is connectable to the power train, and means for releasably coupling the units to each other. The second unit comprises a follower which is shiftable back and forth along a guide member of the power train, an antifriction bearing having a first race rotatable with a clutch engaging and disengaging element of the first unit and a non-rotatable second race on the follower, and means for shifting the follower along the guide member. The coupling means comprises at least one detent which is movably carried by one of the units, a socket for the detent in the one unit, and a detent engaging member provided on the other unit to normally prevent uncoupling of the units. The apparatus further comprises means for confining the detent in the socket in response to shifting of the follower to a predetermined position relative to the guide member to thus permit uncoupling of the units and separation of the prime mover and power train from each other.

The coupling means can employ a resilient detent which is stressed in response to confinement in the socket to the extent necessary to permit separation of the first and second units, i.e., the detent tends to leave the socket and again prevent uncoupling of the two units upon shifting of the follower from the predetermined position.

The confining means can be provided on the guide member and can include a confining portion (e.g., in the form of a collar or sleeve) which is spaced apart from the detent in response to shifting of the follower in a predetermined direction away from the predetermined position. Such confining portion can be disposed between the prime mover and the detent in response to shifting of the follower in the predetermined direction away from the predetermined position.

Alternatively, the confining means can be mounted on the one unit with freedom of movement relative to the one unit and relative to the power train. Such friction clutch can further comprise means for entraining the confining means into engagement with the detent to confine the detent in the socket in response to shifting of the follower to the predetermined position relative to the guide member. The confining portion of such confining means is disposed between the prime mover and the detent in response to shifting of the follower from the predetermined position in the predetermined direction. Such clutch can further comprise means for biasing the confining means toward the prime mover and against a stop of the one unit. The entraining means can move the confining means relative to the one unit and away from the stop against the opposition of the biasing means in response to shifting of the follower to the predetermined position.

The friction linings of the clutch plate or clutch disc of the friction clutch are subject to wear as a result of repeated engagement and disengagement of the clutch. The clutch engaging element of the clutch is arranged to engage the clutch on movement with the follower to a preselected position relative to the guide member, and such preselected position varies as a result of progressing wear upon the friction linings of the clutch plate. Therefore, the improved clutch is preferably designed in such a way that the confining portion of the confining means confines the detent in the socket in the predetermined position of the follower but is spaced apart from the detent in each preselected position of the clutch engaging element, i.e., regardless of the extent of wear upon the friction linings.

The detent can include or constitute a ring having a diameter which decreases in response to confinement in the socket. The ring tends to expand out of the socket in response to shifting of the follower from the predetermined position. Such clutch can further comprise means for limiting the extent of expandibility of the ring upon shifting of the follower from its predetermined position. The arrangement may be such that the ring bears against the engaging member in the predetermined position of the follower. The ring can be engaged by the confining means in a partly expanded condition in which a portion of the ring projects from the socket, and the limiting means is then designed to limit radial expansion of the ring to ensure that the ring cannot expand beyond the aforementioned partly expanded condition in response to uncoupling of the two units from each other.

The socket can constitute a ring-shaped recess or groove, and the detent can include or constitute a split ring, for example, a ring which consists of wire. The ring is preferably resilient.

If the socket is a ring-shaped groove, that surface of the one unit which surrounds the groove can include a substantially conical portion or ramp which tapers in a direction from the prime mover toward the power train. A corrugated spring and/or other suitable means can be provided to bias the detent against the ramp.

The aforementioned limiting means can be used to stress a detent in the form of a resilient ring by maintaining the ring in the socket upon uncoupling of the two units from each other. The ring is normally designed to tend to expand radially outwardly, and the limiting means can comprise a sleeve which surrounds and prevents radially outward expansion of the ring upon uncoupling of the two units from each other.

The guide member can constitute a tubular body which defines a straight elongated path for the follower, and the confining means can be fixedly connected with the guide member against movement in the longitudinal direction of the path.

It is also possible to provide the confining means on the first race.

The confining means can comprise a tubular member having a substantially U-shaped cross-sectional outline and including an inner collar and an outer collar. The latter constitutes the aforementioned confining portion, i.e., it serves to confine the detent in the socket in response to shifting of the follower to the predetermined position.

The tubular member which constitutes the confining means is preferably coaxial with the tubular member which constitutes or forms part of the guide member. The tubular confining means can be mounted on an end portion of the tubular guide member which is remote from the power train. The means for connecting the confining tubular member to the end portion of the tubular guide member preferably includes means for holding the confining means against axial movement relative to the tubular guide member.

The confining means can be provided on the one unit and can include at least one projection which engages a stop on the guide member in response to shifting of the follower from the predetermined position. This ensures that the projection and the stop cooperate to prevent separation of the follower from the guide member.

The apparatus can further comprise means for biasing the confining means away from the detent.

Furthermore, the apparatus can comprise means for releasably locking the second unit to the guide member. The locking means can be disposed at a first radial distance from the axis of the preferably tubular guide member, and the coupling means is preferably disposed at a greater second radial distance from such axis.

The shifting means can comprise a fluid-operated motor (e.g., a hydraulic motor) having a cylinder and a piston. The piston can constitute or form part of the aforementioned follower, and the detent can be provided on such piston. The piston can constitute a tube which is reciprocable in the cylinder and surrounds the guide member. The confining means can be provided on the piston.

The aforementioned locking means can comprise a first part including a second detent and a second socket for the second detent, and a second part including a second detent engaging member. One of these parts is provided on the one unit, and the other of these parts is provided on the guide member. The piston of the aforementioned fluid-operated motor can constitute the follower which is suiftable along the guide member. The first part of the locking means can be provided on the guide member, and the second part of the locking means can be provided on the piston. Such friction clutch can further comprise means for confining the second detent in the second recess when the second detent engaging member is spaced apart from the second detent as a result of unlocking of the piston from the guide member. Such means for confining the second detent engaging member is or can be resilient so that it is deformable by the piston in response to reengagement of the second detent with the second detent engaging member.

Another feature of the invention resides in the provision of a release apparatus for a pull-type friction clutch for use between a prime mover and a power train which is separably connectable to the prime mover. The improved apparatus comprises a first component (such as a cover or a housing of the friction clutch), a diaphragm spring including a radially outer portion engageable with the first component and a radially inner portion engageable with a second component (e.g., an axially movable rotary pressure plate) of the clutch, a plurality of units including a first unit which is connectable with the radially inner portion of the diaphragm spring and a second unit having a follower shiftable along a guide member of the power train, a means for shifting the follower along the guide member, and a coupling having means for releasably connecting the first and second units to each other. The connecting means of the coupling includes at least one detent on one of the first and second units and a detent engaging member provided on the other of the units to engage the at least one detent in a predetermined position of the follower relative to the guide member. The apparatus further comprises means for automatically releasing the at least one detent for disengagement from the detent engaging member in response to shifting of the follower from the predetermined position in the course of separation of the prime mover from the power train. The releasing means is movable by the guide member. The at least one detent and the guide member are movable relative to each other in a first direction to and from a position in which the at least one detent is movable relative to the guide member in a second direction to become disengaged from the detent engaging member and to thus uncouple the first and second units from each other.

The guide member can constitute an elongated tube and the follower can constitute or resemble a sleeve which is slidable along the guide member. The shifting means can comprise a fork, and the radially inner portion of the diaphragm spring can include resilient prongs having tips which are connected to the first unit by a suitable clip or the like. The at least one detent can include a ring which is movable radially relative to the guide member to become disengaged from the detent engaging member. The fork can be mounted on the power train, and the diaphragm spring can be said to form part of the first unit.

A further feature of the invention resides in the provision of a release apparatus for a pull-type friction clutch for use between a prime mover and a power train in a motor vehicle. The apparatus comprises a first unit having a rotary clutch engaging/disengaging device (e.g., a combination of a disc and a diaphragm spring) which is to be mounted on the prime mover, and a second unit including an actuator having a fluid operated motor which is to be mounted on the power train and includes a first part and a second part which is reciprocable relative to the first part. The first unit further includes an antifriction bearing which is installed between the engaging/disengaging device and the second part of the motor and includes a first race rotatable with the engaging/disengaging device and a second race reciprocable with the second part, and means for connecting the first race to the clutch engaging/disengaging device. The apparatus further comprises means for releasably coupling the units to each other, and such coupling means comprises at least one detent provided on one of the units and a detent engaging member which is provided on the other unit and form-lockingly engages the at least one detent in a predetermined position of the second part relative to the first unit to couple the units to each other. The apparatus also comprises means for releasably locking the second part in preselected positions of the first and second parts relative to each other.

The first part can include a cylinder and the second part can include a piston which is reciprocable in the cylinder. As mentioned above, the clutch engaging-/disengaging device can comprise a diaphragm spring and the connecting means then comprises means for connecting the first race to the prongs of the diaphragm spring.

The locking means preferably comprises means for automatically connecting the second part to the power train in response to movement of the prime mover and the power train to predetermined positions relative to each other.

The arrangement is preferably such that the second part of the motor is movable through a first distance to assume the predetermined position and through a lesser second distance to assume the preselected position during connection of the prime mover and the power train to each other.

The motor can be operated to unlock the second part and/or to engage the at least one detent with the detent engaging member.

The locking means can comprise a second detent and a member which form-lockingly engages the second detent in the preselected position of the second part of the motor.

The apparatus preferably further comprises means for automatically disconnecting the detent of the coupling means from the respective detent engaging member and for thereby operating the locking means. The motor includes means for moving the second part through a first distance to operate the locking means and through a greater second distance to disconnect the detent of the coupling means from the respective detent engaging member.

The locking means is preferably disposed at a first radial distance from the common axis of the two parts of the motor, and the coupling means can be disposed at a greater second radial distance from such axis.

If the power train comprises a guide member and the second part of the motor includes a piston, the locking means can include means for releasably locking the piston to the guide member. The piston is preferably dimensioned and designed to surround the guide member. The detent of the coupling means can be provided on the second part of the motor, i.e., on the piston.

The disconnecting means is preferably positioned in such a way that the second part of the motor must be moved relative to the first part and relative to the guide member of the power train in order to ensure that the disconnecting means disconnects the detent and the detent engaging member of the coupling means from each other.

The locking means can comprise a second socket, a second detent in the socket and a second detent engaging member which engages the second detent in the preselected position of the motor parts relative to each other. The second socket and the second detent can be provided on the guide member of the power train, and the second detent engaging member can be provided on the second part of the motor.

The apparatus can further comprise means for confining the second detent member in the second socket in response to movement of the motor parts from the preselected positions relative to each other. The confining means can constitute a corrugated spring or another deformable resilient element which can be deformed by the second part of the motor.

An additional feature of the invention resides in the provision of a release apparatus for a pull-type friction clutch for use between a prime mover (such as an internal combustion engine) and a power train in a motor vehicle. The apparatus comprises a fluid operated motor which serves to effect engagement and disengagement of the clutch. The motor comprises a first part and a second part which defines with the first part a first chamber and a second chamber, and the motor further comprises means for admission and evacuation of a pressurized fluid into and from the chambers. The arrangement is such that the first chamber receives pressurized fluid to disengage the clutch and the second chamber receives pressurized fluid to move the second part of the motor in a direction toward the prime mover.

The apparatus further comprises a first unit having clutch engaging/disengaging means (such as a diaphragm spring), a second unit which includes the motor, and means for releasably coupling the units to each other in response to movement of the second part to a predetermined position. The apparatus also comprises means for locking the second part in response to movement of such second part to a preselected position. The motor can be designed in such a way that it comprises means for admission and evacuation of hydraulic fluid into and from one of the chambers, and means for admission and evacuation of pneumatic fluid into and from the other chamber.

The novel features which are considered as characteristic of the invention are set forth in particular in the appended claims. The improved release apparatus itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1 is a fragmentary axial sectional view of a release apparatus for a pull-type friction clutch which is installed between the prime mover and the power train of a motor vehicle and wherein the two units are coupled to each other;

FIG. 1g illustrates a different connection between the detent confining means and the guide member;

FIG. 1h is a sectional view substantially as seen in the direction of arrows from the line Ih—Ih in FIG. 1g;

FIG. 3 is a fragmentary axial sectional view of a third release apparatus, with the two units coupled to each other;

FIG. 3g illustrates a special configuration of the surface bounding the socket for the detent in a clutch which is similar to that shown in FIG. 3;

FIG. 4 is a fragmentary axial sectional view of an additional release apparatus wherein the means for confining the detent is mounted on the inner race of an antifriction bearing forming part of the unit which is mounted on the power train;

FIG. 5a shows a portion of the apparatus of FIG. 5, with the two units separated from each other;

FIG. 5b shows the structure of FIG. 5a during a first stage of coupling the two units to each other;

FIG. 5c shows the structure of FIG. 5b during a further stage of establishment of a coupling between the two units;

FIG. 5d illustrates an additional stage of establishment of a coupling between the two units of the apparatus of FIG. 5;

FIG. 5e illustrates the structure of FIG. 5d, with the two units properly coupled to each other as in FIG. 5;

FIG. 5f illustrates the structure of FIG. 5e during a first stage of uncoupling of the two units from each other;

FIG. 5h shows the two units in positions they assume upon completed uncoupling, substantially as shown also in FIG. 5a.

DESCRIPTION OF THE PREFERRED EMBODIMENTS

Figure 1A:
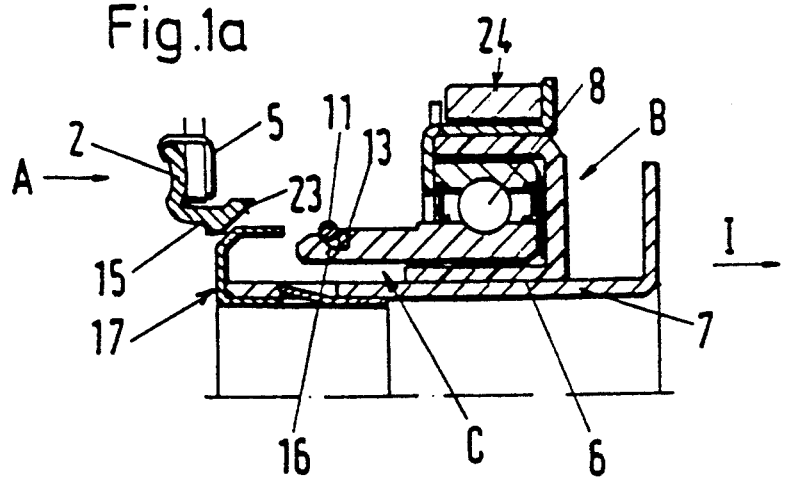
FIG. 1a is a fragmentary axial sectional view of the apparatus of FIG. 1, with the two units uncoupled from each other.

Referring first to FIG. 1, there is shown a release apparatus 1 for a pull-type friction clutch which can be engaged to transmit torque between the output element (e.g., a crankshaft) CS of an internal combustion engine in a motor vehicle and the input element of a power train PT (e.g., a power train including a variable-speed transmission) in the vehicle. The release apparatus 1 comprises a first unit A which is mounted on the engine including the output element CS before the assembly of the apparatus is completed, a second unit B which is connected to the power train PT prior to completed assembly of the apparatus and a coupling unit C (hereinafter called coupling for short) which can be used to releasably couple the unit A to the unit B in order to thus complete the assembly of the apparatus 1, i.e., to establish a torque transmitting connection which is operative as soon as the clutch is engaged.

The unit A comprises a clutch engaging and disengaging element composed of a disc-shaped member 2 (hereinafter called disc for short) and a diaphragm spring having prongs 3. The free end portions or tips 4 of the prongs 3 are coupled to the disc 2 by a resilient retaining ring or clip 5.

The details of various other parts of the release apparatus 1 are or can be similar or identical to those of the apparatus which is disclosed in commonly owned U.S. Pat. No. 4,738,343 granted Apr. 19, 1988 to Paul Maucher for "Friction clutch and actuator therefor". The disclosure of this patent is incorporated herein by reference.

The unit B comprises a tubular follower 6 which is shiftable along a tubular guide member 7 affixed to the casing of the power train PT. The follower 6 carries an antifriction ball bearing 8 having an outer race 9 which is non-rotatably mounted in the follower, an inner race 10 having an extension 10a and being rotatable relative to the outer race 9, and at least one annulus of spheres, needles or otherwise configurated rolling elements between the two races. The bearing 8 has limited freedom of radial movement relative to the follower 6 so that it can be automatically centered on the follower. The coupling C serves to separably or releasably connect the extension 10a of the inner race 10 of bearing 8 (i.e., the unit B) with the axially extending portion 2a of the disc 2 forming part of the unit A. Thus, the engine including the crankshaft CS can be separated from the power train PT in response to deactivation of the coupling C, i.e., in response to reestablishment of separability of the units A and B.

The coupling C comprises a detent 11, a socket 12 for the detent 11, and a detent engaging member 15 constituted by an undercut portion of the axially extending portion 2a of the disc 2. The socket 12 is a circumferentially complete ring-shaped groove in the external surface of the extension 10a of the inner race 10, and the detent 11 is a split ring which is preferably made of wire and exhibits a tendency to expand radially outwardly when not forced to extend, to a considerable degree, into the adjacent portion of the socket 12. FIG. 1 shows the detent 11 (hereinafter called ring for short) in stressed condition of abutment with a frustoconical portion or ramp 16 of the internal surface bounding the socket 12. The corrugated spring 13 is installed in the socket 12 adjacent the substantially radially extending portion or shoulder 14 of the surface bounding the socket to bias the ring 11 against the ramp 16. At the same time, the ring 11 bears against the undercut detent engaging member 15 of the axially extending portion 2a of the disc 2. Thus, the ring 11 is located in the path of the engaging member 15 if this member is to be moved in a direction (arrow II in FIG. 1b) to engage the disc 2 with the race 10, i.e., to connect the unit A with the unit B which is tantamount to connecting the engine with the power train PT.

The inner race 10 and its extension 10a share the angular movements of the diaphragm spring including the prongs 3 when the release apparatus 1 is in use. If the ring 11 is forced into the socket 12 against the resistance of the spring 13 to an extent which is necessary to enable the undercut member 15 to ride over the socket 12 in a direction to the left (see FIG. 1f), the coupling C is inactive and the unit A can be separated from the unit B. At such time, the resilient ring 11 stores a sufficient amount of energy to expand radially outwardly as soon as the application of a radially inwardly oriented force is terminated or the force is weakened to an extent necessary to permit expansion of the ring 11 due to its innate resiliency. However, it is equally within the purview of the invention to employ a detent 11 in the form of a ring or an equivalent thereof which exhibits a minimal amount of resiliency or no resiliency at all. The tendency of the ring 11 to expand radially outwardly is then imparted by the corrugated spring 13 or by one or more equivalent biasing devices which tend to urge the ring 11 against the ramp 16 and against the undercut member 15 when the follower 6 is shifted to the (predetermined) axial position of FIG. 1. At such time, the ring 11 is clamped between the undercut member 15 and the ramp 16 in a condition of radial expansion such that the disc 2 cannot ride over the socket 12 in a direction (arrow II) to be slipped off the extension 10a of the inner race 10.

The apparatus 1 can be engaged by applying to the disc 2 and diaphragm spring including the prongs 3 a force in the direction of arrow II while the disc is maintained in the position of FIG. 1 relative to the follower 6. Such force can be applied only as long as the ring 11 is properly clamped between the ramp 16 and the undercut member 15 so that the disc 2 cannot move to the axial position of FIG. 1a or 1b in which the ring 11 is disposed between the follower 6 and the undercut member 15. The ramp 16 is a conical or substantially conical surface whose diameter increases in a direction from the power train PT toward the engine (including the crankshaft CS). This ensures that the diameter of the ring 11 increases automatically in response to shifting of this ring by the spring 13 in a direction to the left (arrow II), i.e., away from the power train PT and away from the race 9 and rolling elements of the bearing 8. Otherwise stated, the conical surface constituting the ramp 16 tapers in a direction toward the power train PT.

Figure 1B:
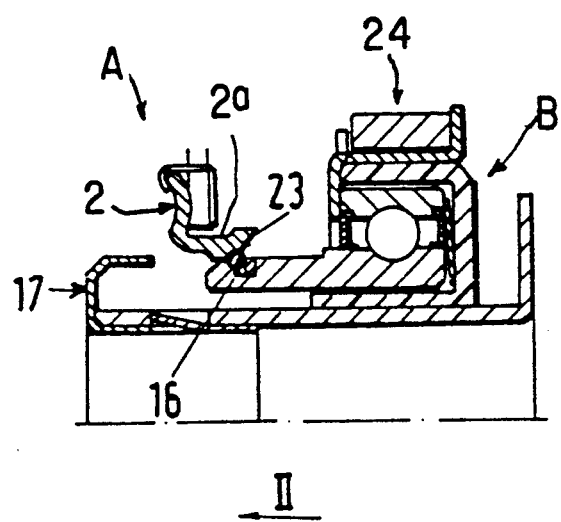
FIG. 1b shows the structure of FIG. 1a during a first stage of coupling the two units to one another.
Figure 1C:
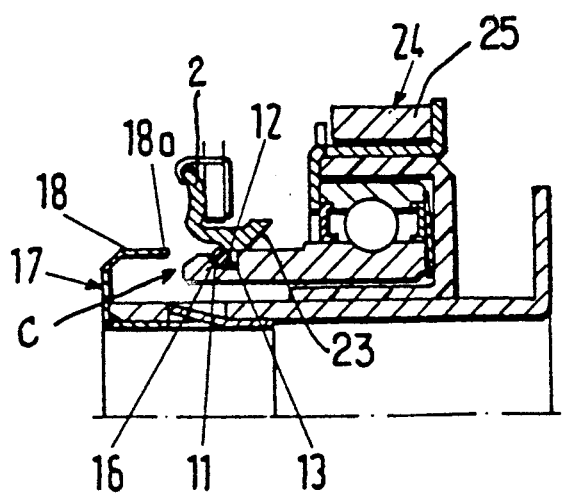
FIG. 1c shows a further stage of the establishment of a connection between the two units.
Figure 1D:
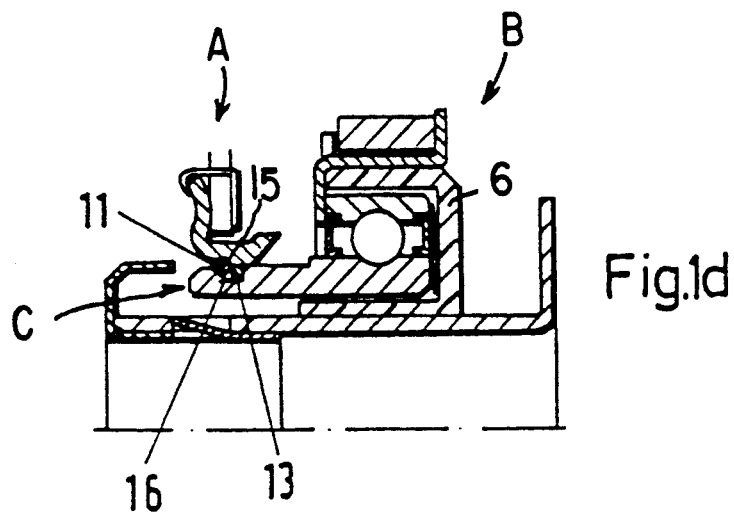
FIG. 1d shows the structure of FIGS. 1a, 1b and 1c with the two units in positions corresponding to those shown in FIG. 1.
Figure 1E:
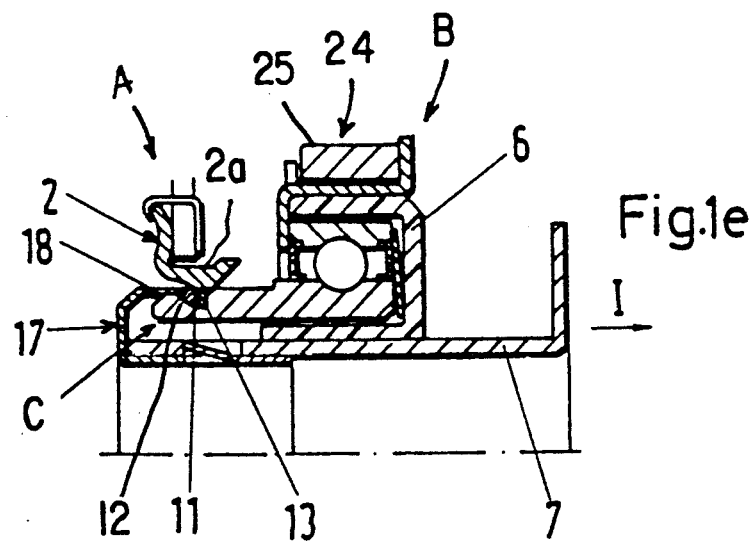
FIG. 1e shows the structure of FIG. 1d during a first stage of uncoupling of the two units from each other.

The direction in which the diaphragm spring including the prongs 3 must be acted upon in order to disengage the apparatus 1 (i.e., to permit the crankshaft CS to rotate independently of the input element of the power train PT), is indicated by the arrow I (FIGS. 1, 1a and 1e). This causes the ring 11 to bear against the undercut member 15 under the action of the ramp 16 so that the connection between the units A and B is strengthened in a fully automatic way.

In order to deactivate the coupling C, the ring 11 must be confined in the socket 12 to an extent greater than shown in FIG. 1, namely to the extent which is necessary to enable the undercut portion 15 to move over the socket 12 in the direction of arrow II. The means for confining the ring 11 in the socket 12 to the just described extent includes an unlocking or releasing device 17 having a substantially U-shaped cross-sectional outline with a first substantially cylindrical sleeve-like collar 19 in the interior of the tubular guide member 7 of the power train PT, and a second substantially cylindrical sleeve-like collar 18 which constitutes the confining portion of the releasing device 17 and is located in the path of movement of the follower 6 and race 10 with ring 11 in a direction to the left, as viewed in FIG. 1, i.e., in response to shifting of the follower 6 axially of the guide member 7 in a direction away from the power train PT and toward the engine including the crankshaft CS. The releasing device 17 is separably connected to the free left-hand axial end of the guide member 7 in such a way that the collars 18, 19 are held against axial movement in a direction away from the power train PT and that the device 17 is also held against rotation relative to the guide member 7. The detent or ring 11 is located between the confining portion or collar 18 of the releasing device 17 and the race 9 of the bearing 8 when the follower 6 and the bearing 8 assume the predetermined positions of FIG. 1 in which the ring 11 is clamped between the undercut member 15 and the ramp 16.

The means for connecting the releasing device 17 to the free end portion of the guide member 7 comprises projections in the form of lugs 20 which are bent out radially outwardly from the collar 19 and extend into complementary slots or cutouts of the guide member 7. The lugs 20 are resilient so that they can yield in response to introduction of the collar 19 into the guide member 7 but thereupon pivot radially outwardly as soon as they reach the respective slots or cutouts of the member 7. The left-hand or front edge faces of the prongs 20 then abut the radially extending surfaces or stops 21 in the respective cutouts of the guide member 7 so that the releasing device 17 cannot be slipped off the guide member until and unless the prongs 20 are expelled radially inwardly and out of the respective cutouts.

FIGS. 1g and 1h illustrate a modified releasable connection between the guide member 7 of the power train PT (not shown) and the collar 19 of the releasing member 17. The lugs 22 of the collar 19 extend in the circumferential direction of the guide member 7 and into the adjacent cutouts behind the respective stops 21. The connection of FIGS. 1g and 1h exhibits the advantage that the releasing device 17 is connected to the guide member 7 against movement in either axial direction of the collar 19. The connection can be terminated by rotating the releasing device 17 relative to the guide member 7 in a counterclockwise direction, as viewed in FIG. 1h.

FIGS. 1 and 1g further show that the free (left-hand) axial end of the guide member 7 is provided with a bevelled surface 7a to facilitate introduction of the inner collar 19 into the guide member 7. Such bevelled surface 7a can be used with advantage regardless of whether the collar 19 is provided with lugs 20 of the type shown in FIG. 1 or with lugs 22 of the type shown in FIGS. 1g and 1h.

Introduction of the extension 10a of the inner race 10 into the disc 2 is facilitated by the provision of a conical centering surface 23 which is located at the free end of the axially extending portion 2a and diverges in a direction toward the outer race 9. The centering surface 23 facilitates assembly of the engine with the power train PT because the unit A is affixed to the engine before the latter is connected to the power train. The establishment of a connection by the coupling C must be preceded by movement of the power train PT and unit B in the direction of arrow II and/or by movement of the engine and unit A in the direction of arrow I. The conical surface 23 automatically centers the units A and B relative to each other during movement of the engine and power train PT toward each other preparatory to the application of one or more screws, bolts or other suitable fasteners which secure the engine to the power train.

The means for shifting the follower 6 along the guide member 7 applies force to the unit B which is mounted on the power train PT. Such shifting means comprises an actuator 24 which is forked and comprises prongs or tines 25 in abutment with a surface 26 on a sleeve-like part 27 carried by the outer race 9 of the bearing 8. The tines 25 of the actuator 24 can be used to apply pressure against the surface 26, i.e., in the direction of arrow I (toward the power train PT) in order to disengage the apparatus 1. The surface 26 is provided on a radially outwardly extending flange of the part 27, and the latter further comprises a radially inwardly extending flange 26a which overlies the outer race 9 of the bearing 8.

The part 27 is further provided with radially outwardly extending projections or fingers 28 in the form of lugs which are bent from the flange 26a or from the axially extending portion of the part 27 and confine the tines 25 of the actuator 24 in the illustrated positions adjacent the surface 26. The fingers 28 are bent outwardly to assume the positions of FIG. 1 after the assembly of the engine and power train PT is completed. The tines 25 of the actuator 24 can bear against the fingers 28 in order to move the follower 6 along the guide member 7 in a direction toward the collar 18 of the releasing device 17. Once the unit A is moved from the position of FIG. 1a to the position of FIG. 1b, i.e., from the left-hand side of the releasing device 17 to the right-hand side of the collar 18, the actuator 24 can be used to move the unit B in the direction of arrow II (FIG. 1c) in order to enable the coupling C to establish a connection between the units A and B. FIG. 1d also shows the coupling C in the operative condition. The fingers 28 can be replaced with screws, bolts, or any other projections which enable the actuator 24 to push the part 27 and the follower 6 in the direction of arrow II. The direction of movement of the unit B toward the releasing device 17 (arrow II) is counter to the direction of movement (arrow I)of the units A and B along the guide member 7 in order to disengage the apparatus 1.

FIGS. 1a to 1d show various stages of assembly of the engine with the power train PT. The unit A is mounted on the engine prior to coupling of the unit A to the unit B. The unit A includes the disc 2 with the undercut detent engaging member 15 of the coupling C, the clip 5 and the diaphragm spring including the prongs 3. The unit B is mounted on the guide member 7 of the power train PT before the units A and B are coupled to each other. The unit B includes the follower 6, the bearing 8 and the other components of the coupling C, namely the socket 12 and the ring 11. The releasing device 17 is connected to the free end of the guide member 7 subsequent to mounting of the unit B. All this is shown in FIG. 1a. The forked actuator 24 is mounted in the motor vehicle, e.g., on the casing of the variable-speed transmission forming a customary component of the power train PT.

The crankshaft CS of the engine normally contains a pilot bearing for the free end of the input shaft of the variable-speed transmission, and the customary axially parallel external flutes of the input shaft receive the axially parallel keys in the axial bore of a hub forming part of the clutch plate or clutch disc of the friction clutch. Reference may be had, for example, to commonly owned U.S. Pat. No. 5,111,924 granted May 12, 1992 to Wolfgang Reik et al. for "Torque transmitting and torsion damping apparatus for use in motor vehicles". This ensures that the clutch can transmit torque from the crankshaft CS to the input shaft of the transmission when the engine is on and the clutch is engaged.

FIG. 1b shows the next stage of assembly of the engine with the power train PT. The releasing device 17 has been moved through the axially extending portion 2a of the disc 2 so that the unit A is located between the unit B and the device 17. The actuator 24 is thereupon caused to shift the unit B in a direction toward the unit A (FIG. 1c) to automatically activate the coupling C in that the ring 11 is caused to advance to the left beyond the centering surface 23 and the undercut member 15 on the disc 2. The actuator 24 can be pivoted or otherwise moved by hand in order to shift the unit B in the direction of arrow II beyond the axial position of FIG. 1b to the position of FIG. 1c. The conical centering surface 23 enables the undercut member 15 to ride over the ring 11 and to depress this ring deeper into the socket 12 so that the ring is urged against the ramp 16 by the axially extending portion 2a of the disc 2 as well as by the then stressed corrugated spring 13 which reacts against the substantially radially extending surface 14 in the socket. The ring 11 expands radially outwardly when the unit B reaches the axial position of FIG. 1d whereby the spring 13 cooperates with the ramp 16 to urge the ring against the undercut detent engaging member 15 and to thus render the coupling C operative to connect the unit B with the unit A. If the follower 6 is thereupon shifted (from the predetermined position of FIG. 1d) in the direction of arrow I for the purpose of disengaging the clutch, the movement of the unit B with the tines 25 of the actuator 24 is shared by the unit A because the coupling C is operative to hold the unit B against movement axially of the guide member 7 and away from the unit A.

The confining portion including the collar 18 and its free end portion 18a is then spaced apart from the ring 11 of the coupling C a distance which suffices to ensure that the ring cannot accidentally engage and be depressed by the free end portion 18a as a result of more or less pronounced wear upon the friction linings of the clutch plate or clutch disc which forms part of the clutch and is then non-rotatably mounted on the input shaft of the variable-speed transmission forming part of the power train PT. As the wear upon the friction linings of the clutch plate increases, the engagement of the clutch involves a migration of the units A and B toward the releasing member 17. Therefore, the distance of the units A and B from the collar 18 of the releasing member 17 must be selected in such a way that the ring 11 cannot reach the collar 18 when the clutch is engaged at a time when the friction linings on the clutch plate have undergone a considerable amount of wear. Such friction linings are clamped between a flywheel and an axially movable clutch plate of the friction clutch when the latter is engaged so that the flywheel transmits torque to the input shaft of the transmission in the power train PT. Clutch plates with friction linings are shown in commonly owned U.S. Pat. Nos. 4,700,821 and 4,700,822 granted Oct. 20, 1987 to Paul Maucher et al. for "Clutch plate" and "Torsion damping assembly for clutch plates", respectively. The disclosures of these patents are incorporated herein by reference.

The distance of the units A and B from the releasing device 17 in engaged condition of the clutch can be selected practically at will; therefore, it presents no problems to select such distance with a view to account for eventual extensive wear upon the friction linings and/or for excessive pivoting or other movement of the actuator 24 in a direction to move the units A and B toward the collar 18 of the releasing device 17.

Figure 1F:
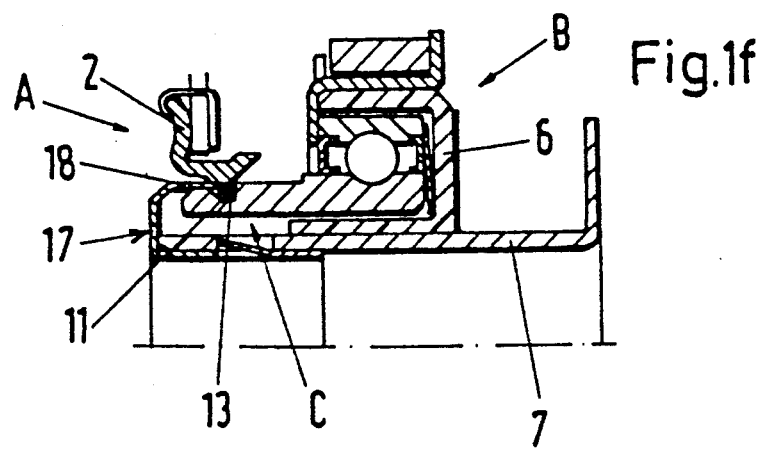
FIG. 1f shows the next stage of uncoupling.

The steps of disengaging the engine from the power train PT, i.e., of deactivating the coupling C to permit separation of the units A and B from each other, are illustrated in FIGS. 1e and 1f. This necessitates a movement of the engine away from the power train PT and/or vice versa in order to enable the free end portion of the collar 18 to confine the ring 11 in the socket 12 to an extent which is necessary to permit the axially extending portion 2a of the disc 2 to ride over the socket 12 and thereupon over the collar 18. Such confinement of the ring 11 under the action of the collar 18 involves stressing of the corrugated spring 13. The extent of stressing of the spring 13 is dependent upon the radially inward deformation of the ring 11 which is necessary in order to enable the units A and B to move from the positions of FIG. 1d to the positions of FIG. 1e and thereupon to the positions of FIG. 1f (if the guide member 7 is stationary) or to move the guide member 7 from the position of FIG. 1d, through the position of FIG. 1e and thereupon to the position of FIG. 1f.

For example, the engine and the power train PT must be temporarily separated in order to replace the clutch plate and/or one or more additional components of the apparatus 1. The engine is thereupon reassembled with the power train PT in the aforedescribed manner, i.e., the coupling C is reactivated to connect the units A and B with each other. The same procedures can be repeated as often as necessary, i.e., the engine can be repeatedly disengaged from and reconnected with the power train PT. This does not necessitate any special undertakings except the removal or loosening of the customary mechanical connection or connections between the engine and the power train and movement of the engine and the power train away from each other in order to enable the collar 18 of the releasing device 17 to confine the ring 11 in the socket 12 to an extent which is necessary to ensure that the disc 2 and its undercut member 15 can ride over the socket 12, over the radially depressed ring 11 in the socket 12 and thereupon over the collar 18.

An advantage of the release apparatus 1 is its simplicity. Furthermore, the apparatus is compact in that the releasing device 17 occupies a minimal amount of space. This releasing device is positioned on the guide member 7 in such a way that it automatically effects a termination of the form-locking engagement between the detent or ring 11 and the undercut member 15 when the prime mover including the crankshaft CS is in the process of being separated from the power train PT, i.e., while the power train moves away from the crankshaft and/or vice versa.

However (and this will be described with reference to FIG. 4), it is equally possible to mount the releasing device on one of the units A and B, for example, on the unit B. This may be desirable or advantageous if the space which is available for installation of the friction clutch is such that the releasing device should not extend axially beyond the guide member.

An advantage of a detent (11) which exhibits at least some resiliency so that it tends to increase its diameter is that it is not absolutely necessary to provide discrete biasing means (such as the corrugated spring 13) in order to urge the detent to a position in which it automatically form-lockingly engages the undercut member 15 when the follower 6 is moved to the predetermined position of FIG. 1, namely to a position in which the coupling C is effective to connect the units A and B to each other. The gap between the free ends of the split ring 11 which constitutes the detent of FIG. 1 should be sufficiently wide to ensure that the diameter of the ring can be reduced by the collar 18 of the releasing device 17 to an extent which is required to adequately confine the ring in the socket 12, i.e., to enable the units A and B to move to the axial positions of FIG. 1a. Thus, radial expansion of the detent 11 need not be initiated and/or promoted by the guide member 7 but takes place as a result of inherent resiliency of the detent and/or as a result of the provision of the corrugated spring 13 or equivalent biasing means.

The extent of radial expansion of the detent 11 when the releasing device 17 is inoperative can be limited by the selected inherent resiliency of the detent or in a manner to be described with reference to FIGS. 3 and 4 which show sleeves serving as a means for limiting the extent of expansion of the detent. As already mentioned before, the inherent tendency of the detent 11 to increase its diameter can be selected in such a way that the detent is at least slightly stressed when it assumes the position of form-locking engagement with the undercut member 15 of the coupling C. The stressing of the detent 11 is increased due to the provision of the corrugated spring 13. It is particularly desirable to ensure that a fresh detent 11 exhibits a reasonable tendency to increase its diameter because this guarantees that the detent properly engages the undercut member 15 after a certain period of use of the friction clutch, i.e., it is desirable to account for eventual aging and resulting loss of some resiliency of the material of the detent. Moreover, the friction clutch is less likely to generate noise if the detent 11 is invariably stressed during engagement with the undercut member 15.

The corrugated spring 13 or an equivalent spring (e.g., a diaphragm spring) serves the additional purpose of at least substantially centering the detent or ring 11 relative to the collar 18 of the releasing device 17 or relative to the undercut member 15 of the disc 2.

Automatic deactivation of the coupling C during movement of the prime mover and of the power train PT away from each other is ensured by the fact that the releasing device 17 shares the movements of the guide member 7 which, in turn, shares the movements of the power train. Thus, the operators need not pay any particular attention to the coupling C because this coupling is deactivated as soon as the distance between the prime mover and the power train PT increases to an extent which is required to enable the collar 18 to confine the detent 11 in the socket 12 in a manner and to the extent as shown in FIG. 1f. On the other hand, the actuator fork 24 can be used to complete the activation or reactivation of the coupling C by causing the unit B to move toward the prime mover in the direction of arrow II, namely from the position of FIG. 1b to the position of FIG. 1d. The detent 11 can move with the follower 6 and guide member 7 in the axial direction of the guide member, and the detent moves radially of the guide member 7 (i.e., at right angles to the axis of the member 7) when it is to expand into form-locking engagement with the undercut member 15 or to contract under the action of the collar 18 to be confined in the socket 12.

The actuator fork 24 can move the unit B relative to the power train PT in the direction of arrow I or in the direction of arrow II, i.e., toward or away from the releasing device 17. As mentioned above, this actuator can be used as a means for activating the coupling C as a result of movement of the unit B and its follower 6 to the predetermined positions of FIG. 1. The fork 24 can be replaced with an actuator (such as a fluid operated motor of the type shown in FIG. 5) which is even more fully integrated into the friction clutch and can form part of one of the units A and B, such as the unit B which is carried by the power train. The fork 24 is mounted on the power train PT, together with the unit B, before the latter is coupled to the unit A on the prime mover.

Figure 2:
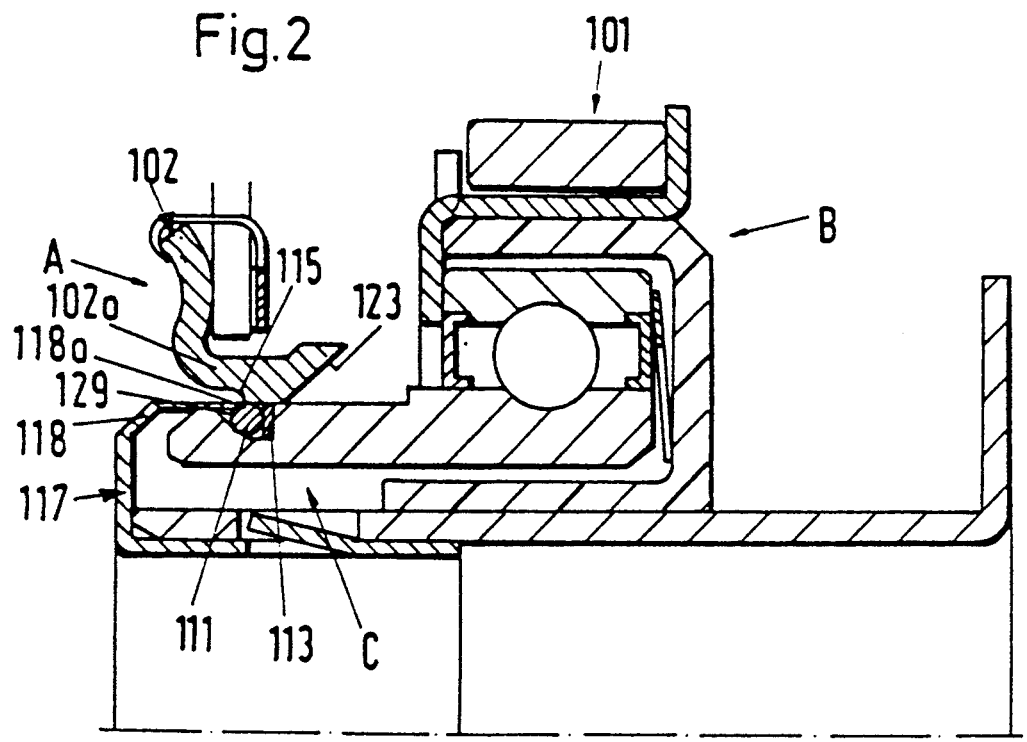
FIG. 2 is a fragmentary axial sectional view of a second release apparatus which employs a detent having a conical facet engageable by a portion of the confining means.

FIG. 2 shows certain portions of a second release apparatus 101 wherein the units A and B can be separably connected to each other by a modified coupling C. All such parts of this apparatus which are identical with or clearly analogous to corresponding parts of the apparatus 1 are denoted by similar reference characters plus 100. The main difference between the couplings C of FIGS. 1 and 2 is that the coupling of FIG. 2 employs a detent 111 in the form of a radially expandable split ring which has a conical facet or flat 129. The facet 129 confronts the free end 118a of the confining portion or collar 118 of the releasing device 117 when the coupling C of FIG. 2 is operative to releasably connect the units A and B to each other. The facet 129 can be said to constitute a ramp or cam face which facilitates confinement of the ring 111 in the socket 112 preparatory to separation of the units A and B from each other, i.e., preparatory to movement of the axially extending portion 102a and undercut detent engaging member 115 of the disc 102 over the socket 112 and thereupon over the collar 118.

Figure 2A:
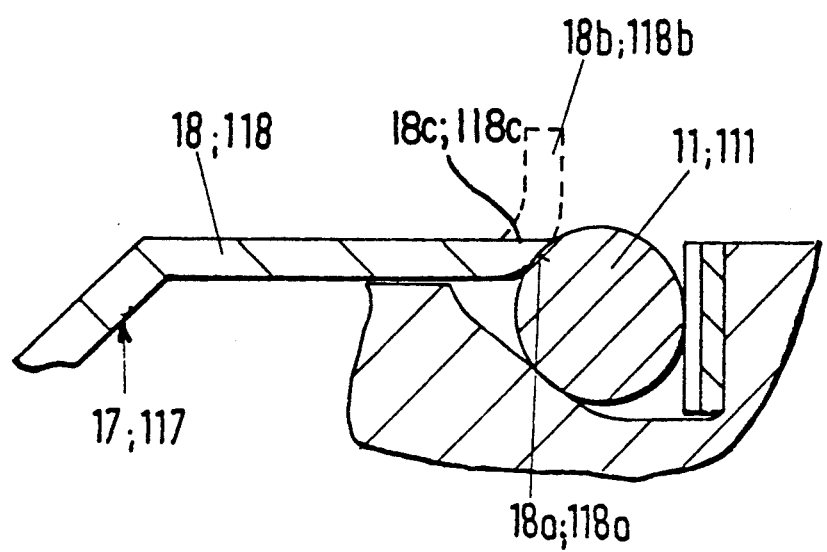
FIG. 2a is an enlarged view of a detail in FIG. 1, showing the manner of forming the confining means for the detent.

FIG. 2a shows one presently preferred mode of making the confining or releasing device 17 or 117. This device can be formed by deep drawing of metallic stock in a suitable machine to form the collars 18, 19 or 118, 119 (only the collar 18 or 118 is shown in FIG. 2a). The free end portion of the collar 18 or 118 has a radially outwardly extending flange 18b or 118b. The flange 18b or 118b is thereupon severed along the line 18c or 118c to ensure that the collar 18 or 118 cannot interfere with the movement of the unit A thereover. However, there remains a suitably rounded surface 18a' or 118a' which facilitates depression and confinement of the ring 11 or 111 in the respective socket 12 or 112 when the releasing device 17 or 117 is to be put to use for the purpose of deactivating the coupling C so that the respective units A and B can be disengaged from each other, i.e., to permit separation of the engine from the power train.

FIG. 3 shows a portion of a further release apparatus 201 constituting a modification of the apparatus 1 and 101. All such parts of the apparatus 201 which are identical with or clearly analogous to corresponding parts of the apparatus 1 are denoted by similar reference characters plus 200. The units A and B are respectively mounted on the engine (prime mover) and on the power train of a motor vehicle and are releasably connected to each other by a coupling C including a resilient detent in the form of a radially expandible wire ring 211. The extension 210a of the inner race 210 of the antifriction bearing 208 is surrounded by an axially movable retaining sleeve 230 which constitutes a means for limiting the extent of radial expansion of the ring 211 when the units A and B are separated from each other (see FIG. 3a). The ring 211 is then maintained in a partially expanded condition but is confined in the socket 212 of the inner race 210. In other words, the retaining sleeve 230 stresses the ring 211 but the latter expands and increases its diameter as soon as it is permitted to do so in response to axial shifting of the inner race 210 and the retaining sleeve 230 relative to each other. The ring 211 is resilient and is inserted into the socket 212 in stressed condition so that it tends to expand and bears against the retaining sleeve 230 when the latter is maintained in the axial position of FIG. 3a.

The retaining sleeve 230 is biased axially and away from the follower 206 by two diaphragm springs 231 which are mirror images of each other and react against an external shoulder of the extension 210a of the inner race 210. The diaphragm springs 231 operate in series and automatically shift the retaining sleeve 230 to the position of FIG. 3a as soon as the coupling C is deactivated, i.e., as soon as the undercut member 215 of the disc 202 of the unit B is moved to the left and beyond the ring 211.

That end portion of the internal surface of the retaining sleeve 230 which engages the ring 211 is bounded by a conical surface 232 which tapers toward the axis of the guide member 207 in a direction toward the bearing 208, i.e., toward the power train whose casing carries the guide member 207. The inclination of the conical surface 232 with reference to the axis of the guide member 207 need not exceed 60°. A portion of the ring 211 engages the maximum-diameter end of the conical surface 232 when the springs 231 are free to maintain the retaining sleeve 230 in the axial position of FIG. 3a.

Figure 3A:
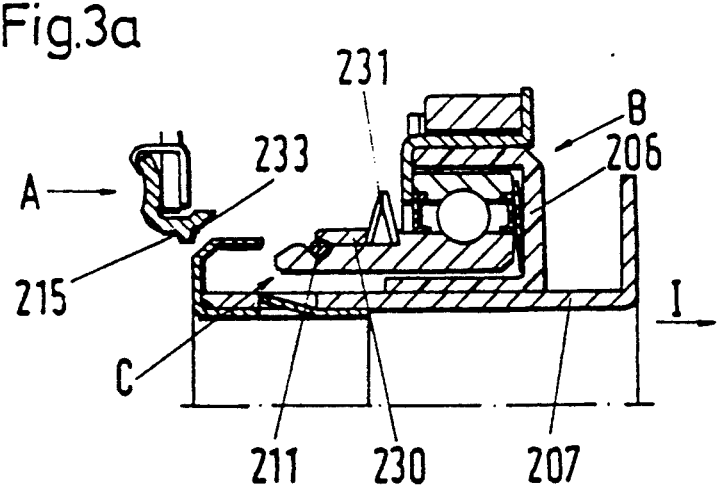
FIG. 3a illustrates a portion of the friction clutch of FIG. 3, with the two units uncoupled from each other.
Figure 3B:
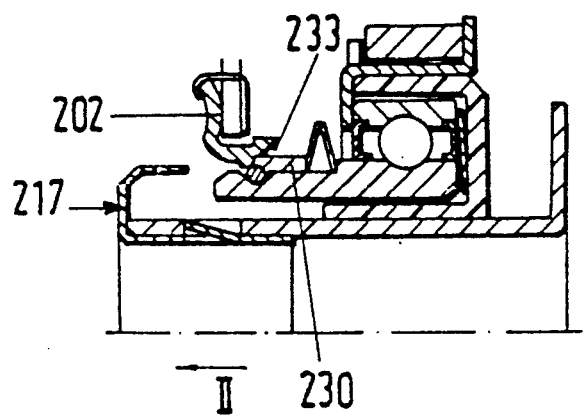
FIG. 3b illustrates the structure of FIG. 3a and shows a first step of establishing a separable connection between the two units.

The diameter of the wire of the ring 211 and the depth of the socket 212 are selected in such a way that the radially outermost portion of the ring 211 projects slightly beyond the peripheral surface of the extension 210a when the ring 211 is fully received in the socket 212. This ensures that the radially compressed ring 211 acts as a stop for the retaining sleeve 230 in that the conical surface 232 engages and is arrested by the radially outermost portion of the ring 211 when the sleeve 230 is caused to slide toward the releasing device 217 under the action of the diaphragm springs 231. Such position of the sleeve 230 and such radially inwardly stressed condition of the ring 211 are shown in FIG. 3a. The arrangement is preferably such that the springs 231 continue to store at least some energy when the sleeve 230 is arrested by the ring 211; this ensures that the sleeve 230 reliably retains the ring 211 in the socket 212, i.e., the ring extends into the deepmost portion of the socket and remains in such position as long as the units A and B remain disconnected from each other.

Figure 3C:
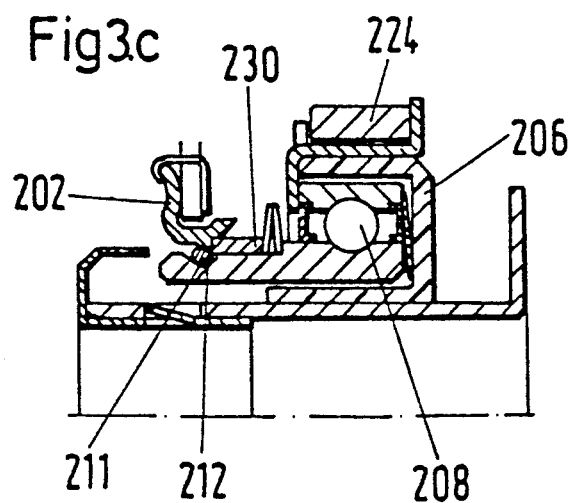
FIG. 3c illustrates the structure of FIG. 3b during a second stage of establishment of a connection between the two units.

The axially extending portion 202a of the disc 202 forming part of the unit A is provided with a radially inwardly extending annular projection 233 in the form of an internal rib which serves as a pusher for the left-hand end face of the sleeve 230 and can shift the sleeve along the extension 210a when the axial distance between the units A and B is being reduced, i.e., when the disc 202 is caused to displace the sleeve 230 toward the follower 206 to thereby stress the diaphragm springs 231 (compare FIGS. 3a and 3c). The pusher 233 is provided on the axially extending portion 202a of the disc 202 between the undercut member 215 and the conical centering surface 223. The springs 231 ensure that the sleeve 230 urges the disc 202 in a direction to the left (arrow II in FIG. 3b) when the coupling C is reactivated so that the undercut member 215 then bears against and urges the ring 211 into pronounced engagement with the ramp 216 in the socket 212 of the extension 210a. Thus, the springs 231 serve to to ensure that, once the connection between the units A and B is established or reestablished, such connection remains intact (i.e., the coupling C remains active) until and unless an operator decides to increase the extent of confinement of the ring 211 in the socket 212 by causing the collar 218 of the releasing device 217 to engage the ring (FIGS. 3e and 3f).

FIGS. 3a to 3d illustrate the steps of activating the coupling C, i.e., of connecting the units A and B to each other. The first step involves moving the units A and B closer to each other (from the positions of FIG. 3a to those shown in FIG. 3b) whereby the disc 202 advances over and beyond the releasing device 217, or the device 217 advances within and beyond the disc 202. The pusher 233 of the disc 202 engages the adjacent end face of the sleeve 230 and shifts the latter from the axial position of FIG. 3b to the axial position of FIG. 3c so that the diaphragm springs 231 store additional energy. At such time, the engine and the power train are properly positioned relative to each other and the undercut member 215 cooperates with the ramp 216 to clamp the ring 211 between them and to thus prevent unintentional separation of the units A and B from each other. The pronounced bias of the strongly stressed diaphragm springs 231 ensures that the undercut member 215 exerts a force which is necessary to guarantee that the coupling C remains activated or operative until and unless the operators decide to intentionally interrupt the connection between the units A and B. Shifting of the unit B from the position of FIG. 3b, through the position of FIG. 3c and to the position of FIG. 3d (while the axial position of the unit A remains unchanged) is effected by the actuator 224 which shifts the follower 6 and hence the unit B in the direction of arrow II.

Figure 3D:
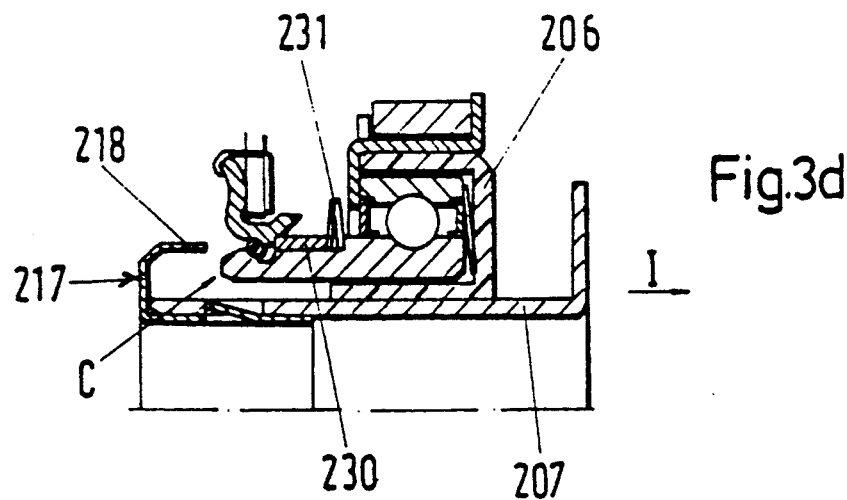
FIG. 3d shows the units of FIGS. 3a to 3c properly coupled to each other, the same as in FIG. 3.
Figure 3E:
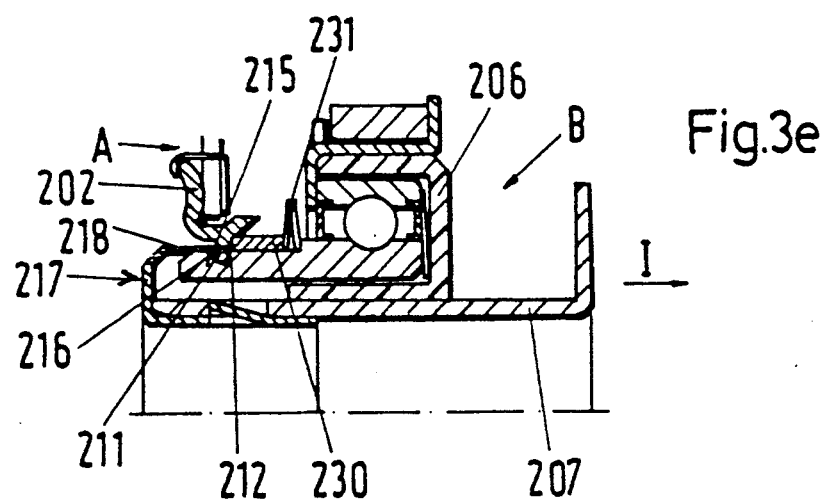
FIG. 3e shows a first stage of uncoupling the units of FIGS. 3 to 3d from each other.
Figure 3F:
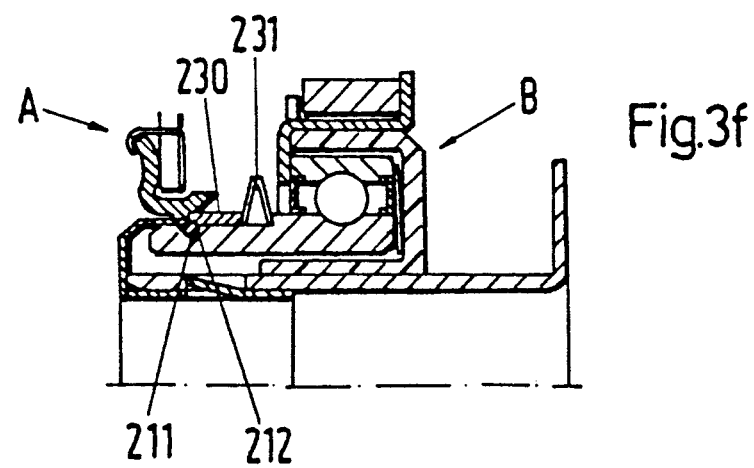
FIG. 3f shows a further stage of uncoupling the units of FIGS. 3 to 3e from each other.

The pusher 233 shifts the sleeve 230 from the axial position of FIG. 3c to the axial position of FIG. 3d in response to axial shifting of the unit B by the actuator 224. This enables the ring 211 to expand due to its innate resiliency so that it first engages the internal surface of the axially extending portion 202a of the disc 202 and immediately thereafter expands against the undercut member 215 to be clamped between this member and the ramp 216. Of course, the ring 211 need not be expandible solely due to its innate tendency to expand radially outwardly. For example, it is possible to employ a ring which is made of a ductile or only slightly resilient material and to provide a corrugated spring (corresponding to the spring 13 of FIG. 1) or an equivalent device which biases the ring against the cam face 216 to thereby urge the ring to expand radially outwardly against the conical surface 232 of the sleeve 230, against the internal surface of the axially extending portion 202a of the disc 202 or against the undercut member 215.

If the engine is to be separated from the power train which carries the guide member 207, the direct mechanical connection (e.g., one or more screws, bolts and nuts and/or other suitable fasteners) is interrupted so that the engine and the power train can be moved away from each other in the axial direction of the guide member 207 as soon as the coupling C between the units A and B of FIGS. 3 and 3d is deactivated. Movement of the engine and power train away from each other can involve a movement of the engine away from the power train and/or a movement of the power train away from the engine. It is now assumed that the power train is being moved away from the engine so that the guide member 207 moves in the direction of arrow I (FIG. 3d). Thus, the releasing device 217 (which shares the axial movement of the guide member 207 in the direction of arrow I) moves toward, and its collar 218 ultimately reaches, the ring 211 which bears against the undercut member 215 (FIG. 3e). The collar 218 causes the ring 211 to reduce its diameter, i.e., a larger portion of the ring 211 is confined in the socket 212 in that the ring slides along the ramp 216 toward and perhaps even into the deepmost portion of the socket 212. The radially outermost portion of the thus confined ring 211 is then located radially inwardly of the undercut member 215 so that the unit A, and hence the engine, can be moved axially of the guide member 207 and away from the power train and/or the power train can be moved away from the engine. The axially extending portion 202a of the disc 202 slides along the external surface of the collar 218. FIG. 3e shows the guide member 207 in that axial position in which the free end portion of the collar 218 has confined the ring 211 in the socket 212 radially inwardly of the undercut member 215, and FIG. 3f shows the position of the unit B subsequent to further movement in the direction of the arrow I so that the diaphragm springs 231 are free to dissipate at least some energy in order to return the sleeve 230 to the axial position of FIG. 3a (the same as in FIG. 3f) so that the ring 211 is partially confined in the socket 212 by being engaged by the conical surface 232 of the sleeve 230. As mentioned hereinbefore, the springs 231 continue to store some energy when the sleeve 230 reaches the axial position of FIG. 3f so that the conical surface 232 engages the ring 211 and maintains it in a condition of partial radial expansion which is slightly different from that shown in FIG. 3c or 3d, namely a position in which the ring 211 is confined within the internal surface of the axially extending portion 202a of the disc 202 and by the undercut member 215, respectively.

FIG. 3g shows a somewhat different configuration of the surface bounding the socket 212 for the ring 211. This surface is provided in the external or peripheral surface of the extension 210a of the inner race of the bearing 208 (not shown in FIG. 3g).

The ramp 216 which forms part of the surface bounding the recess 212 includes several sections which are disposed next to each other in the axial direction of the extension 210a and guide member 207 (not shown in FIG. 3g). The radially outermost section 234 of the ramp 216 is a concave surface with a radius of curvature matching or approximating that of the wire of the ring 211. The section 234 is located diametrically opposite the undercut member 215 when the wire 211 is maintained in the clamped position of FIG. 3g (corresponding to the position of FIG. 3 or 3d).

The section 234 of the ramp 216 is located radially outwardly of a frustoconical second section 216a which is tangential to the section 234 and merges into a third section 236 in the deepmost portion of the socket 212. The reference character 235 denotes a zone of gradual transition between the sections 216a and 236. The configuration is preferably such that each of the sections 216a, 236 is tangential to the zone 235. Such configuration of the ramp 216 ensures that the surface bounding the socket 212 offers relatively little resistance to radial expansion or contraction of the ring 211 under the action of the sleeve 230 or due to innate tendency of the ring to increase its diameter.

The curvature of the ramp 216 (as seen in the sectional view of FIG. 3g) can be altered to avoid an entirely smooth transition between neighboring sections. For example, the transition zone 235 (whose radius of curvature can equal or approximate the radius of curvature of the wire of the ring 211) can be replaced with a zone 235a which is indicated by broken lines and extends into the section 216a. In fact, the zone 235a can replace the zone 235 and the section 216a so that it defines with the section 234 a pronounced edge. Such pronounced edge can be smoothed by removing some material of the extension 210a to thus reestablish a small portion of the conical section 216a.

The character alpha$_1$ denotes in FIG. 3g an acute angle between the internal surface of the axially extending portion 202a of the disc 202 and a line which is tangential to the concave surface bounding the left-hand side of the undercut member 215. This angle is larger than an acute angle alpha$_2$ between the internal surface of the portion 202a (or the external surface of the extension 210a) and a line extending tangentially of the conical section 216a. Such selection of the angles alpha$_1$ and alpha$_2$ further enhances the reliability of the coupling C when the latter is active to connect the units A and B to each other, i.e., when the ring 211 is maintained in the condition of FIG. 3g so that its external surface abuts the concave surface of the undercut member 215 and the concave section 234 of the ramp 216.

The distance 1 indicates the difference between the positions of the ring 211 (as seen in the axial direction of the extension 210a) when the ring respectively engages the conical section 216a and the zone 235a. It will be seen that the diameter of the ring 211 changes very little if the section 216a and zone 235 are replaced with the zone 235a.

FIG. 4 shows a release apparatus 301 wherein the retaining sleeve 330 is biased toward the socket 312 in the peripheral surface of the extension 310a of the inner race 310 of the antifriction bearing 308 by a coil spring 331 which reacts against an external shoulder of the inner race 310. The sleeve 330 limits the extent of radial expansion of the ring 311 in the socket 312 when the units A and B are disconnected from each other, i.e., when the coupling C is inactive and the unit A can be slipped off the extension 310a by sliding along the external surface of the outer collar 318 of the releasing device 317.

In contrast to the heretofore described embodiments of the improved release apparatus, the retaining device 317 is mounted, with certain freedom of axial movement, on the free end portion of the extension 210a of the inner race 310, i.e., on that end portion which is remote from the power train (not shown in FIG. 4). The inner collar 319 of the retaining device 317 is axially movably received in the extension 310a of the inner race 310 and is provided with outwardly extending elastic lugs 320. These lugs are maintained in contact with the stop faces 321 in the respective slots of the extension 310a under the action of a corrugated spring 337 reacting against the adjacent end face of the extension 310a and bearing against the inner side of the releasing device 317 between the collars 318 and 319. The lugs 320 abut the respective stop faces 321 when the coupling C is effective to connect the units A and B to each other and the operator wishes to disengage the friction clutch 301 by moving the unit B in the direction of the arrow I. The corrugated spring 337 (which can be replaced by other suitable energy storing means) urges the releasing device 317 to the left-hand end position of FIG. 4 in which the collar 318 does not interfere with clamping of the ring 311 between the undercut member 315 of the axially extending portion 302a of the disc 302 and the ramp 316 in the socket 312 of the extension 310a.

The inner collar 319 of the releasing device 317 comprises a radially inwardly extending projection in the form of a flange 338 which can be arrested by an entraining means here shown as a stop 339 in a groove 340 machined into or otherwise formed in the external surface of the guide member 307. The projection or flange 338 cooperates with the stop 339 when the operator or operators wish to disconnect the engine from the power train. Thus, if the actuator 324 causes its tines 325 to shift the follower 306 of the unit B along the guide member 307 of the power train in a direction to the left (as seen in FIG. 4) relative to the unit A (which is mounted on the engine), the projection 338 strikes the stop 339 and the extension 310a moves relative to the releasing device 317 against the opposition of the spring 337 so that the outer collar 318 can confine the ring 311 in the socket 312 to an extent which is necessary to permit the unit A to ride over the depressed ring 211 and over the collar 318. The projection 338 can constitute a circumferentially complete flange or it may consist of several discrete lugs which are bent radially inwardly from the inner collar 319 of the releasing device 317. The stop 339 can constitute a split ring which is caused to snap into the external groove 340 at the free end of the guide member 307.

The conical front surface 323 on the axially extending portion 302a of the disc 302 facilitates accurate centering and rapid attachment of the units A and B to each other. The axially extending portion 302a further comprises a pusher 333 (corresponding to the pusher 233 in the friction clutch 201 of FIGS. 3 to 3f) which is biased by the spring 331 through the sleeve 330 when the coupling C is active to connect the units A and B to each other. The pusher 333 then urges the undercut member 315 against the ring 311 and the latter bears against the ramp 316 in the socket 312 to prevent the member 315 from sliding over the recess 312 and onto the outer collar 318 of the releasing device 317. The left-hand end face (or a conical surface corresponding to the conical surface 232 shown in FIG. 3) of the sleeve 330 bears against the radially outermost portion of the ring 311 when the units A and B are disconnected from each other to thus ensure that the ring 311 remains in the socket 312 and extends into the path of the outer collar 318 to be depressed deeper into the socket 212 for reconnection of the units A and B to each other. The ring 311 is confined in the socket 312 while the pusher 333 rides over the socket but the ring expands, preferably in view of its innate resiliency, when the pusher 333 has advanced beyond the major portion of the socket 212, i.e., when the ring 211 is free to expand toward and to engage the concave surface of the undercut member 315.

The construction and mounting of the actuator 324 are similar to the construction and mounting of the actuator 24. Thus, the tines 325 of the actuator 324 are confined between the surface 326 of the radially outwardly extending flange of the sleeve-like part 327 and the radially outwardly extending projections or fingers 328 which are acted upon by the tines when the actuator 324 is pivoted or otherwise moved relative to the casing of the power train in a direction to move the unit B toward the unit A. The tines 325 of the actuator 324 engage the surface 326 when the actuator is pivoted in a direction to disengage the friction clutch, i.e., to move the pressure plate of the clutch away from the clutch plate so that the latter is no longer clamped between the pressure plate and a flywheel which is driven by the engine. The sleeve-like part 327 is affixed to the outer race 309 which forms part of the antifriction bearing 308 and does not rotate when the clutch is in use.

The fingers 328 of the sleeve-like part 327 are pushed by the actuator 324 in a direction to the left, as viewed in FIG. 4, when the operator or operators wish to connect or reconnect the unit B with the unit A. This causes the unit B to move axially of the guide member 307 toward the disc 302 and diaphragm spring (prongs 303) of the unit A. The coupling C is activated or reactivated when the distance between the units A and B is reduced to that which is shown in FIG. 4, i.e., when the pusher 333 is located to the right of the ring 311 and the latter is free to expand radially outwardly toward engagement with the concave surface of the undercut member 315. The ring 311 is thereupon clamped between the undercut member 315 and the ramp 316 in the socket 312 under the action of the sleeve 330 which is biased by the coil spring 331 and bears against the pusher 333. Once the units A and B assume the relative axial positions of FIG. 4, they are reliably coupled to each other and can move jointly in the direction of arrow I in order to disengage the friction clutch by effecting the required deformation of the diaphragm spring including the prongs 303.

If the operators wish to disconnect the engine from the power train, i.e., to deactivate the coupling C so that the units A and B can be moved axially and away from each other, the first step involves removal or loosening of the mechanical connection or connections (e.g., screws, bolts and nuts and/or other fasteners) which connect the engine and the power train to each other when the motor vehicle is in use. Separation of the engine and the power train from each other can be effected by moving the engine axially of the guide member 307 and away from the power train and/or by moving the power train axially of the guide member 307 and away from the engine. This results in a movement of the guide member 307 axially of the follower 306 (in the direction of arrow I) and axially of the coupling C, and causes the stop 339 in the groove 340 to engage and entrain the projection 338 in the direction of arrow I so that the corrugated spring 337 is caused to store energy while the releasing member 317 slides relative to the inner race 310 and the outer collar 318 confines the ring 311 in the socket 312. Such confinement (actually a more pronounced confinement) of the ring 311 in the socket 312 is facilitated by the configuration of the ramp 316 and of the concave surface on the undercut member 315. The unit A is then free to move axially and away from the unit B and/or vice versa in that the pusher 333 and the undercut member 315 of the axially extending portion 302a of the disc 302 are free to slide over the socket 312 and along the external surface of the collar 318 which then maintains the ring 311 in the confined position. For example, the unit B can be pulled in the direction of arrow I to move away from the unit A whereby the inner race 310 and the releasing device 317 slide within the axially extending portion 302a of the disc 302. The spring 331 dissipates energy as the extension 310a moves relative to the disc 302 (in the direction of arrow I) whereby the sleeve 330 remains in engagement with the pusher 333 until it reaches the partially expanded ring 311 and thereupon bears against this ring and maintains it in the recess 312 during the interval of disconnection of the engine and the power train from each other. The sleeve 330 thus ensures that the ring 311 is maintained in an optimum condition of radial expansion for engagement by the collar 318 of the releasing member 317 when the coupling C is to be reactivated, i.e., when the units A and B are to be reconnected to each other.

Instead of abutting the ring 311, the sleeve 330 can bear against the left-hand end face of the collar 318 when the units A and B are disconnected from each other. The ring 311 is then fully confined in the socket 312 under the sleeve 330 is again displaced by the pusher 333 to stress the spring 331 and thus enable the ring 311 to expand into engagement with the concave surface of the undercut member 315.

An advantage of the release apparatus 301, and more particularly of the feature that the releasing device 317 is mounted on one of the units A and B rather than on the guide member 307, is that the device 317 is less likely to be accidentally moved toward the power train to thus deactivate the coupling C at a time when the units A and B should remain coupled to each other, i.e., when the undercut member 315 should form-lockingly engage the detent or ring 311. The stop 339 for the projection or flange 338 of the inner collar 318 of the releasing device 317 is axially spaced apart from the device 317 when the follower 306 assumes the predetermined axial position of FIG. 4 in which the coupling C is effective to connect the units A and B to each other. This ensures that the coupling C remains operative regardless of the extent of wear upon the friction linings on the clutch plate and/or upon other parts of the friction clutch 301.

An advantage of the spring 337 is that the lugs 320 of the releasing device 317 are always urged toward the respective stop faces 321, i.e., the spring 337 urges the device 317 in a direction away from the unit B and toward the prime mover (which is assumed to be located to the left of FIG. 4). The releasing device 317 moves relative to the inner race 310 in a direction away from the prime mover when the guide member 307 is moved in the direction of arrow I in order to move the power train away from the prime mover. At such time the spring 337 is caused to store additional energy and the coupling C is automatically deactivated because the outer collar 318 of the device 317 confines the detent or ring 311 in the socket 312 to the extent necessary to permit disconnection of the units A and B from each other.

The sleeve 330 cooperates with the coil spring 331 and with the pusher 333 to ensure that the radially outermost portion of the ring 311 projects from the socket 312 to an extent which is needed to ensure further confinement of the ring 311 in the socket when the collar 318 of the releasing device 317 is caused to move in the direction of arrow I (relative to the inner race 310) in order to automatically deactivate the coupling C when the prime mover is in the process of being moved axially of the guide member 307 and away from the power train and/or when the power train is being moved away from the prime mover. At such time, the projection 338 is engaged and pushed by the stop 339 to move the releasing device 317 toward the follower 306 and to thus stress the corrugated spring 337. Innate resiliency of the material of the ring 311 ensures that this ring bears against the sleeve 330 when the unit A is moved to the left of the collar 318 so that the sleeve 330 can directly engage the ring 311 and urge it against the cam face 316 or even against the adjacent end face of the retracted collar 318.

Figure 5:
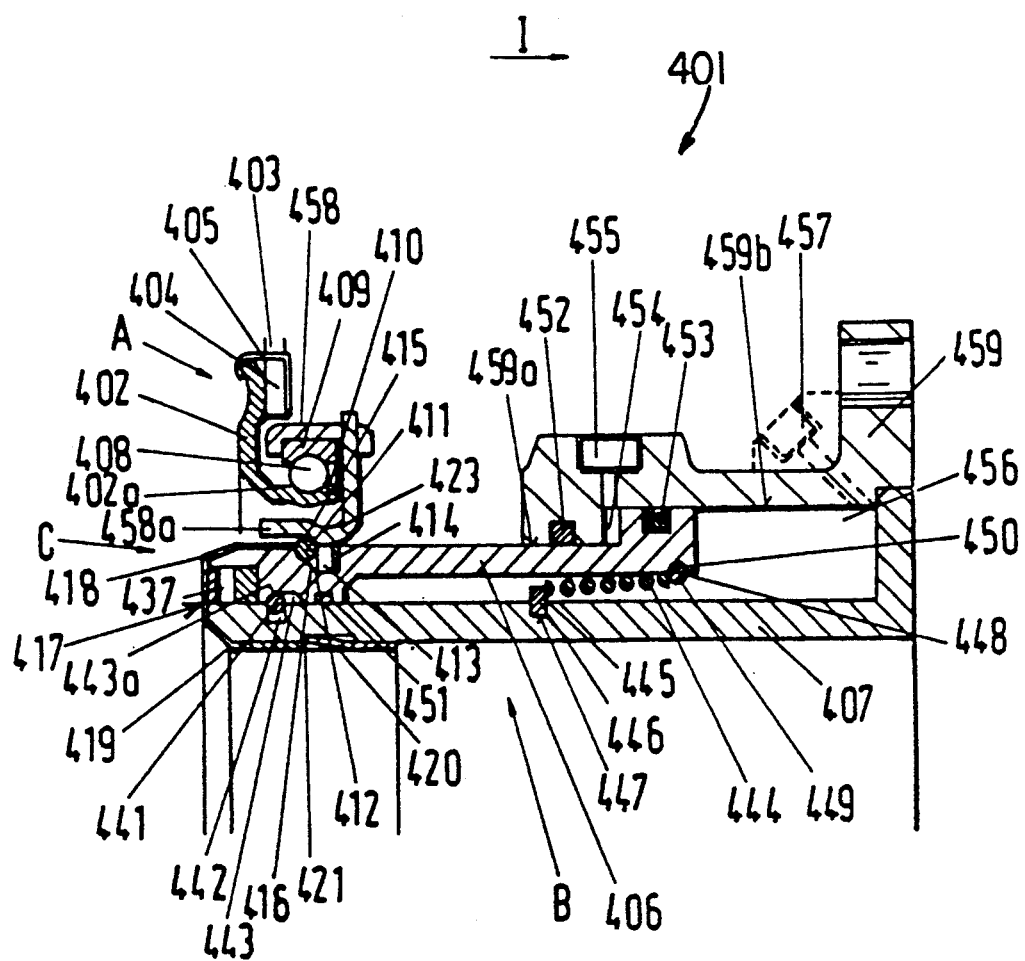
FIG. 5 is a fragmentary axial sectional view of a release apparatus wherein the follower and the guide member are releasably locked to each other.

FIG. 5 illustrates a release apparatus 401 wherein the follower 406 can be shifted axially of the guide member 307 by a double-acting fluid-operated (e.g., hydraulic) motor including a cylinder 459 which is affixed to the power train, i.e., to the guide member 307. The antifriction bearing 408 forms part of the unit A (i.e., it is mounted on the engine), and the coupling C again serves to releasably connect the unit A with the unit B.

The unit A further comprises the disc 402 and the diaphragm spring including prongs 403 having free radially inner end portions or tips 404 which are affixed to the disc 402 by a clip 405. The unit A is mounted on the engine prior to activation of the coupling C, and the axially extending portion 402a of its disc 402 constitutes or includes the inner race 410 of the antifriction bearing 408. The outer race 409 of the bearing 408 is installed within a sleeve-like component 458 having a substantially C-shaped or U-shaped cross-sectional outline. The open side of the component 458 faces away from the cylinder 459, i.e., toward the radially outwardly extending portion of the disc 402. The bearing 408 and the component 458 have limited freedom of radial movement relative to each other to ensure the possibility of a self-centering action.

The unit B is mounted on the power train prior to activation of the coupling C and includes the follower 406 (this follower constitutes a tubular piston of the fluid-operated motor) as well as the cylinder 459. The right-hand end portion of the follower or piston 406 has a radially outwardly extending flange which is guided by and is slidable along the internal surface 459b of the cylinder 459, and the left-hand end portion of the cylinder 459 has a radially inwardly extending flange with an internal surface 459a which guides the major central portion of the follower. The left-hand end portion of the follower 406 has a radially inwardly extending flange which is slidable along the external surface of the guide member 407 on the casing of the power train.

The coupling C comprises a ring-shaped detent 411 which is resilient and is received in a socket 412 provided in the external surface of the left-hand end portion of the follower 406. The surface bounding the socket 412 includes a conical portion or ramp 416 and a substantially radially extending portion 414 adjacent a corrugated spring 413 which biases the ring 411 axially in a direction to the left, i.e., toward the ramp 416.

The inner axially extending portion or leg 458a of the component 458 has an undercut member 415 which can cooperate with the ramp 416 and forms part of the coupling C. When this coupling is active, the undercut member 415 cooperates with the ramp 416 to clamp the ring 411 and to prevent separation of the units A and B in response to operation of the fluid-operated motor in a direction to move the units A and B axially and away from each other. When the friction clutch is to be disengaged, the follower or piston 406 is caused to move in the direction of arrow I (FIGS. 5, 5a and 5d to 5h) and to pull the disc 402 and the prongs 403 of the diaphragm spring of the unit A in the same direction. The piston or follower 406 actually pulls the component 458 and the latter pulls the disc 402 by way of the antifriction bearing 408.

The diameter of the conical surface or ramp 416 in the recess or socket 412 of the follower 406 increases in a direction away from the cylinder 459, i.e., this ramp tapers in a direction toward the axis of the guide member 407 and toward the cylinder 459. In other words, the diameter of the ramp 416 increases proportionally with increasing distance from the power train.

The releasing device 417 of the apparatus 401 is axially movably mounted on the left-hand end portion of the guide member 407. This releasing device includes an outer collar 418 which can confine the ring 411 in the socket 412, and an inner collar 419 which extends into the guide member 407. The manner of connecting the releasing device 417 to the guide member 407 is the same as, or analogous to that, described in connection with FIG. 1 for the guide member 7 and releasing device 17. FIG. 5 shows the lugs 420 which form part of the collar 419 and extend into the complementary cutouts of the guide member 407 adjacent the respective stops 421. A prestressed corrugated spring 437 is provided between the central portion or section of the releasing device 417 and the left-hand end face of the guide member 407 to bias the lugs 420 against the respective stops 421, i.e., to urge the follower 406 toward the power train.

The release apparatus 401 further comprises a locking device including a second detent in the form of a split wire ring 441. The latter extends in part into a circumferential recess or groove 442 in the external surface of the guide member 407 as well as into a groove 443 in the internal surface of the radially inwardly extending flange at the left-hand axial end of the follower or piston 406. The follower 406 has an undercut portion 443a bounding the left-hand side of the groove 443 and having a conical or similar surface which abuts the adjacent portion of the external surface of the ring 441. The ring 441 tends to expand radially outwardly due to its innate resiliency, i.e., to leave the socket 442 and to bear against the surface bounding the groove 443 in the follower 406. The socket 442 is adjacent the free left-hand end of the guide member 407.

The release apparatus 401 further comprises means for biasing the undercut member 443a of the follower 406 against the adjacent portion of the ring 441. Such biasing means comprises a coil spring 444 which reacts against a first retainer 445 including a split ring 446 in a circumferentially complete groove 447 in the external surface of the guide member 407, and bears against a second retainer 448 including a split ring 449 in a circumferentially complete groove 450 provided in the internal surface of the right-hand end portion of the follower 406. The spring 444 is stressed so that it biases the follower 406 in a direction to the right, as viewed in FIG. 5, to thereby urge the undercut member 443a against the ring 441.

The configuration of the surface of the undercut member 443a at the left-hand axial end of the groove 443 in the follower 406 is selected in such a way that the axial force which is necessary to cause the ring 441 to contract radially and to penetrate deeper into the socket 442 should exceed the sum of forces which are applied by the stressed springs 437 and 444.

The cylinder 459, the follower or piston 406 and the guide member 407 define two cylinder chambers 454, 456. The cylinder chamber 454 is sealed by two sealing elements 452 and 453 one of which is recessed into the cylinder 459 and the other of which is recessed into the follower 406. An inlet/outlet opening 455 is provided to admit a pressurized fluid into or to permit evacuation of fluid from the chamber 454. A second inlet/outlet opening 457 is provided for admission of pressurized fluid into and for evacuation of fluid from the cylinder chamber 456. The cylinder chamber 454 receives fluid in order to disengage the friction clutch.

The sealing element 452 is an O-ring. The other sealing element 453 comprises several components including a deformable main component having a square or rectangular cross-sectional outline and preferably consisting of a wear-resistant and heat-resistant material, e.g., a plastic material such as polytetrafluoroethylene.

The radially inner axially extending portion 458a of the component 458 is provided with a conical centering surface 423 which diverges in a direction toward the cylinder 459.

FIG. 5a illustrates the units A and B subsequent to mounting on the engine and on the power train, respectively, but prior to actuation of the coupling C, i.e., prior to actual connection of the engine with the power train. The constituents of the unit B on the power train are shown in positions corresponding to those shown in FIG. 5. Thus, the undercut member 443a of the follower 406 bears against the adjacent radially outer portion of the ring 411. The corrugated spring 413 in the socket 412 stores a minimal amount of energy, and the ring 411 contacts the ramp 416 as well as the adjacent end face of the outer collar 418 of the releasing device 417.

FIG. 5b illustrates the unit B in a position closer to the unit A, it being assumed that the power train and the unit B were shifted in a direction to the left, i.e., counter to the direction which is indicated by the arrow I. The conical centering surface 423 on the radially innermost portion 458a of the component 458 abuts the ring 411. The portion 458a surrounds the collar 418 of the releasing device 417.

FIG. 5c shows the next stage of connecting of units A and B with each other. The portion 458a of the component 458 is in the process of confining the ring 411 in the socket 412 against the opposition of the corrugated spring 413. This causes the ring 411 as well as the spring 413 to store energy. Thus, the situation is analogous to that described hereinbefore in connection with the release apparatus of FIGS. 1 to 1f.

FIG. 5d shows the next stage of connecting the units A and B with each other. In fact, the units A and B are partially connected to each other, i.e., the coupling is about to be activated; however, the friction clutch is yet to be fully assembled. The mutual positions of the parts of the unit B on the power train are the same as shown in FIGS. 5 and 5a. The distance between the unit A and the cylinder 459 of the unit B is less than the final distance (namely by the distance X), i.e., the ring 411 is not clamped between the undercut member 415 of the portion 458a and the ramp 416 in the socket 412. In order to fully assemble the clutch, the opening 455 admits pressurized hydraulic fluid which flows into the chamber 454 and moves the piston or follower 406 in the direction of arrow I to thus move the ring 411 against the undercut member 415 (see FIG. 5e). Furthermore, the pressure of hydraulic fluid in the cylinder chamber 454 suffices to move the undercut member 443a of the follower 406 over the ring 441 which is depressed into the socket 442. The corrugated spring 437 is free to dissipate energy by expanding in a direction toward the cylinder 459 so that it overlies the ring 441 and confines the latter in the socket 442 as can be seen in FIG. 5e. The ring 441 stores energy as a result of confinement in the socket 442 under the action of the spring 437.

As the follower or piston 406 continues to move in the direction of arrow I (due to continued admission of hydraulic fluid into the cylinder chamber 454), the undercut member 415 fully engages the radially outer portion of the ring 411 so that the activation of the coupling C is completed and the axial positions of the units A and B relative to each other are fixed.

FIG. 5e shows the units A and B in axial positions corresponding to those when the friction linings of the clutch plate forming part of the friction clutch have undergone a maximum amount of wear.

Figure 5G:
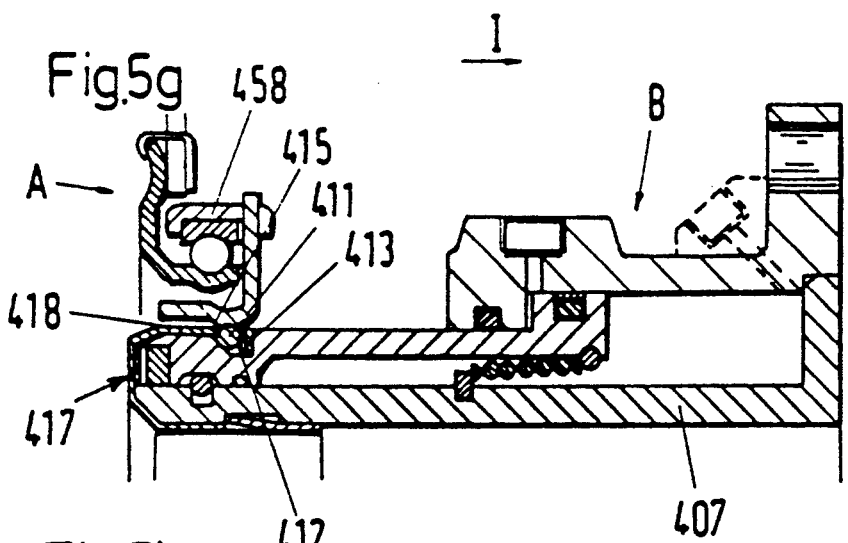
FIG. 5g shows a further stage of uncoupling of the units in the apparatus of FIGS. 5 to 5f from each other.
Figure 5H:
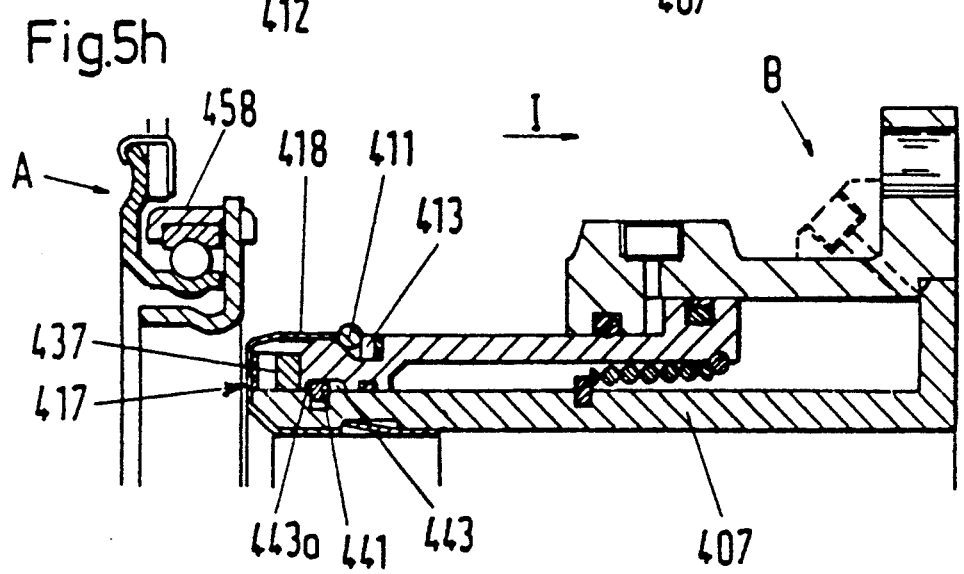

In order to dismantle the friction clutch, i.e., to separate the engine from the power train, it is necessary to first remove the screws, bolts and nuts and/or other fasteners (not shown) which normally establish a mechanical connection between the engine and the power train. This renders it possible to separate the units A and B by deactivating the coupling C with assistance from the releasing device 417 in a manner as shown in FIGS. 5f, 5g and 5h. Since the ring 411 engages the undercut member 415 of the axially extending radially inner portion 458a of the member 458, the position of the follower 406 relative to the unit A remains unchanged, i.e., it corresponds to that which is shown in FIG. 5e. At the same time, the guide member 407 and the power train are moved in the direction of arrow I, i.e., axially and away from the engine. At such time, the opening 454 is connected with an evacuating port to permit the outflow of hydraulic fluid from the cylinder chamber 454. The releasing device 417 shares the movement of the guide member 407 in the direction of arrow I until the corrugated spring 437 reaches the left-hand end face of the follower 406 (compare FIGS. 5e and 5f). The spring 437 is thereupon stressed as a result of further axial movement of the guide member 407 in the direction of arrow I and the rightward progress of the spring 407 is interrupted by the follower 406 so that the ring 441 advances relative to the spring 437 and is free to expand radially outwardly into the groove 443 (FIG. 5f) to be engaged by the concave surface of the undercut member 443a. All this takes place before the coupling C is deactivated, i.e., before the units A and B are disconnected from each other. The ring 441 connects the follower 406 with the guide member 407 in a manner as shown in FIGS. 5, 5a and 5f. As the guide member 407 continues to move in the direction of the arrow I, the collar 418 of the releasing device 417 engages the radially outermost portion of the ring 411 (FIG. 5g) and causes additional confinement of this ring in the socket 412 so that the units A and B can be separated from each other. Further confinement of the ring 411 in the socket 412 takes place against the resistance of the spring 413 which stores energy. The spring 437 also stores additional energy (compare FIGS. 5f and 5g). The unit A is disconnected from the unit B by moving it axially and away from the unit B and/or by moving the unit B axially of the guide member 407 and away from the unit A. Such disconnection or separation involves a movement of the collar 418 and component 458 axially of and relative to each other toward and, if necessary, beyond the positions of FIG. 5h. For example, the power train and the unit B can continue to move in the direction of arrow I while the unit A remains in the position of FIG. 5g. The positions of the units A and B which are shown in FIG. 5h are the same or practically the same as those shown in FIG. 5a. Thus, if desired or necessary, the units A and B can be reconnected to each other in the same way as described with reference to FIGS. 5a to 5e. FIG. 5h further shows the corrugated spring 437 in expanded condition, the same as the corrugated spring 413. Expansion of the spring 437 results in axial shifting of the follower 406 in a direction to the right so that the undercut member 443a moves toward and engages the ring 441. At the same time, the releasing device 417 moves in a direction to the left (relative to the guide member 407) to permit radial expansion of the ring 411 under the bias of the spring 413. The ring 411 is then again located in the path of movement of the collar 418 and is ready to cooperate with the undercut member 415 and the ramp 416 in order to reactivate the coupling C.

Figure 5I:
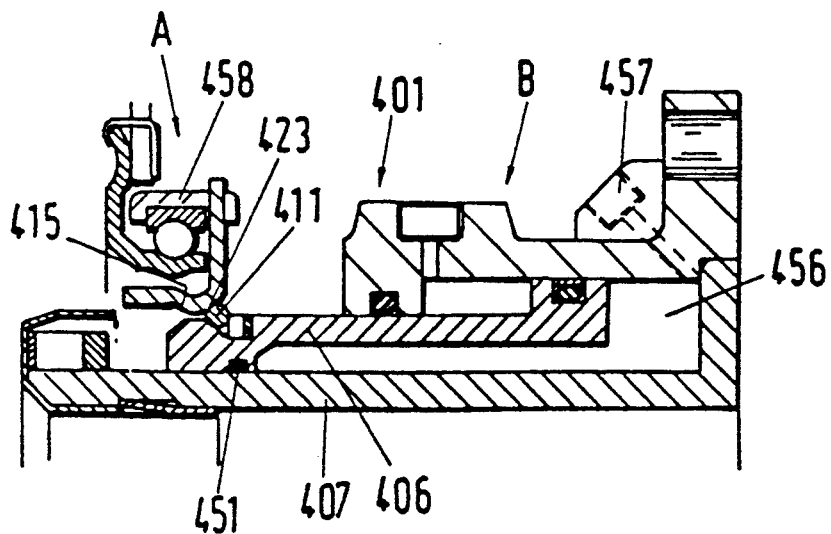
FIG. 5i shows a portion of a release apparatus which constitutes a modification of the apparatus of FIGS. 5 to 5h.
Figure 6:
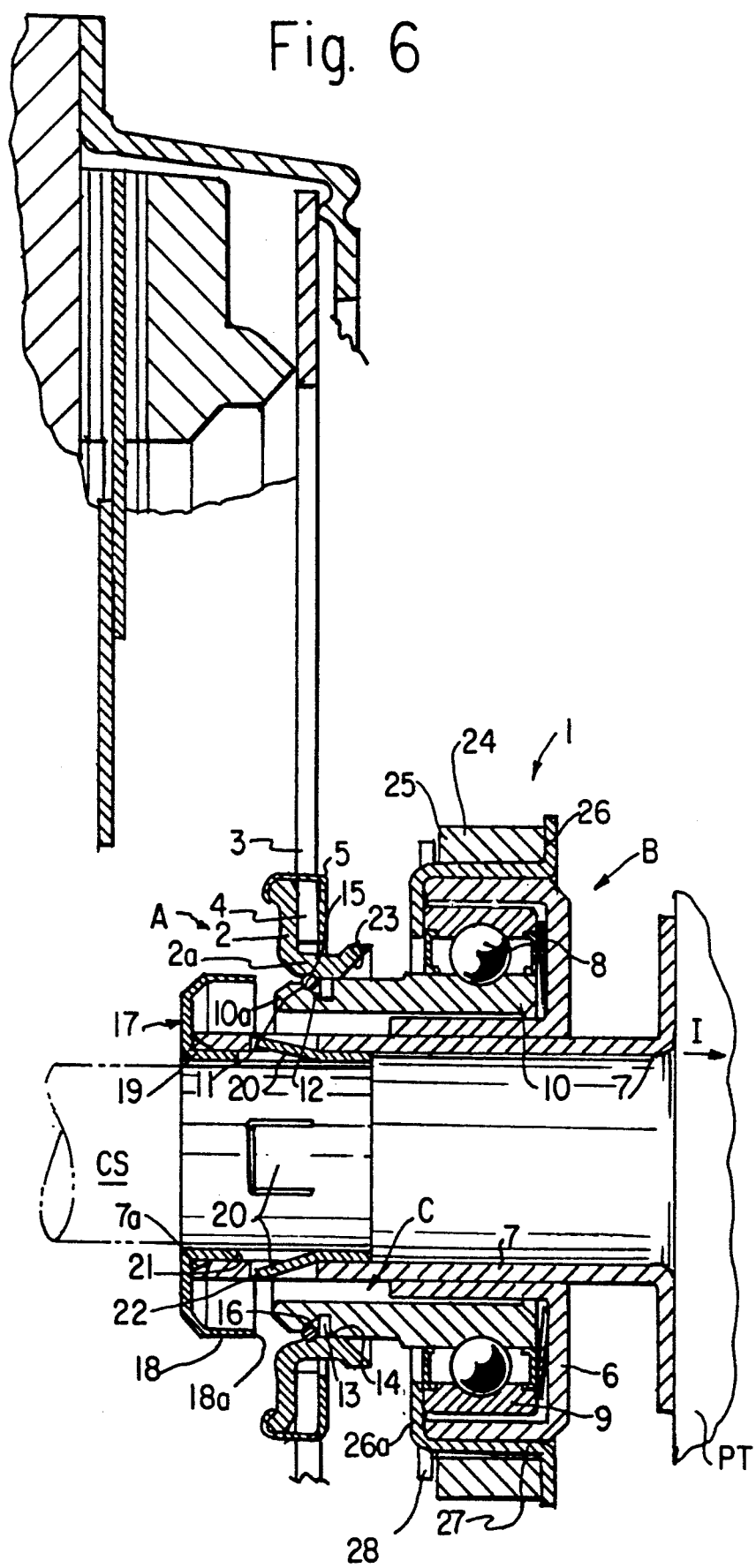
FIG. 6 is a view of the invention showing the clutch plate.

The coupling C of the release apparatus 401 can be activated in a somewhat different way as will be described below with reference to FIGS. 5, 5b and 5i. The basic design of the apparatus 401 remains unchanged. As shown in FIG. 5i, the second detent or ring 441, the second recess or socket 442, the groove 443, the coil spring 444 and the retainers 445, 448 for this coil spring are omitted. These parts are replaced with a ring-shaped sealing element 451 which is recessed into the internal surface of the left-hand end portion of the follower 406 and sealingly engages the external surface of the guide member 407 to seal the cylinder chamber 456 from the atmosphere. The opening 457 is connected to a source of compressed pneumatic fluid, e.g., to an air compressor or the like. A valve, not shown, is provided to control the flow of such fluid into and from the cylinder chamber 456.

Referring again to FIG. 5b (wherein the sealing element 451 is indicated by broken lines), the follower 406 is maintained in the illustrated position relative to the component 458 by the ring 411 while the power train and its guide member 407 are in the process of moving in the direction of arrow I all the way toward and ultimately to the positions of FIG. 5i. The next step involves connecting the engine with the power train. This necessitates engagement of the ring 411 with the undercut member 415 of the axially extending portion 458a of the component 458. Admission of compressed gaseous fluid into the cylinder chamber 456 through the opening 457 results in shifting of the follower 406 axially of the guide member 407 in a direction counter to that indicated by the arrow I, and the ring 411 shares such movement of the follower to move toward and into engagement with the undercut member 415 to thus complete the activation of the coupling C and the establishment of a connection between the units A and B. The opening 457 is then connected with a port for evacuation of compressed air or another gaseous fluid from the chamber 456 and the next-following steps are carried out in a manner as described above with reference to FIGS. 5d and 5e.

An advantage of the locking device including the second detent 441, the second socket 442 and the second undercut member 443a is that the piston 406 can be locked to the guide member 407 in a preselected axial position. When the prime mover and the power train are to be separated from each other, the piston 406 is moved relative to the power train (i.e., relative to the cylinder 459) in a direction toward the prime mover (counter to the direction which is indicated by the arrow I) and can be locked relative to the guide member 407 in the position of FIG. 5g. This facilitates subsequent reconnection of the prime mover with the power train. The locking device is inactive in FIG. 5e in that second detent 441 is confined in the second socket 442 by the corrugated spring 437, i.e., in a given position of the piston 406 relative to the guide member 407.

As already described with reference to FIG. 5d, the steps of reassembling the prime mover with the power train can include moving the unit B toward the prime mover to an extent (distance X) which is more than necessary to ensure proper activation of the coupling C. The chamber 454 of the motor including the cylinder 459 and the piston 406 then receives pressurized fluid to move the piston toward the power train through a distance which is required to activate the coupling C, and the follower 406 is then moved through a second distance which is required to ensure that the second detent 441 engages the undercut member 443a of the locking device to thus fix the piston 406 and guide member 407 in preselected positions relative to each other. The motor including the cylinder 459 and the piston 406 can be used to engage the locking device as well as to activate the coupling C.

The second detent 441 is received in the groove 443 with certain freedom of axial movement. Such axial movability of the detent 441 and the groove 443 relative to each other is desirable and advantageous for more convenient assembly and separation of the prime mover and power train, especially if the releasing device 417 is designed to automatically deactivate the coupling C in response to movement of the power train and the prime mover away from each other. As can be seen in FIGS. 5f, 5g and 5h, the locking device can remain operative while the coupling C is being deactivated to permit separation of the units A and B from each other.

The construction of the release apparatus 401 is preferably such that the preselected position of the piston 406 relative to the guide member 407 in which the locking device is operative is selected in the following way: When the prime mover is being assembled with the power train, the detent 411 and the undercut member 415 must cover a greater distance (the excess is shown in FIG. 5d at X) than is necessary to ensure the establishment of a reliable form-locking connection between these parts.

FIG. 5 further shows that the locking device (including the second detent 411) and the coupling C (including the detent 411) can be closely adjacent each other. Thus, the socket 412 for the detent 411 can be disposed at a first distance from the power train and the distance of the groove 443 from the power train can match or closely approximate the first distance.

The coil spring 444 between the piston 406 and the guide member 407 urges the piston toward the power train. This spring is effective regardless of the extent of wear upon the friction linings of the clutch plate forming part of the fruition clutch 401 and/or of the extent of wear upon other parts of the clutch.

The guide member 407 surrounds the input shaft (not shown) of the variable-speed transmission forming part of the power train PT, and this guide member cooperates with the piston 406 and cylinder 459 to define the cylinder chamber 456. The other chamber 454 is defined only by the piston 406 and cylinder 459.

The apparatus 401 of FIG. 5 exhibits the additional advantage that, when the prime mover is separated from the power train PT, the piston 406 invariably assumes an axial position which ensures automatic activation of the coupling C during reassembly of the prime mover and the power train. Thus, it is not necessary to manually fix the piston 406 in a preselected or predetermined position when the separation of the prime mover and the power train is completed. Furthermore, it is not necessary to manually or otherwise move the piston 406 to a particular position when the reassembly of the prime mover and the power train is completed.

The improved release apparatus is susceptible of numerous additional modifications without departing from the spirit of the invention. For example, the features of the apparatus 1, 101, 201, 301 and 401 can be used in combination with each other and/or interchangeably. Furthermore, the positions of various parts (such as the socket 12 and the detent 11 on the one hand, and the undercut member 15 on the other hand) can be interchanged, the mode of connecting the releasing device to the guide member of the power train or to the inner race of the antifriction bearing can depart from the illustrated mode, the connection between the diaphragm spring and the disc of the unit A can be altered, and so forth. By way of example only, the embodiment of FIG. 5i can employ an energy storing element corresponding to the coil spring 444 of FIG. 5.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalance of the appended claims.

We claim:

1. A clutch release apparatus for a pull-type clutch between a prime mover and a power train, comprising:
   a first unit connectable to the prime mover;
   a second unit connectable to the power train; and
   means for releasably coupling said units to each other comprising
   at least one movable detent carried by one of said units,
   a socket for said detent in said one unit,
   a detent engaging member provided on the other of said units to provide coupling of said units by engagement of said at least one detent and said engaging member to normally prevent uncoupling of said units, and
   releasing means for engaging and confining said detent in said socket in response to shifting of said prime mover and power train relative to each other to a predetermined position to disengage said detent from said engaging member and permit uncoupling of said units and separation of the prime mover and power train from each other.

2. The apparatus of claim 1, further comprising a guide member connected to the power train, and a follower connected to said second unit, said follower being at a certain relative position when such units are coupled and being shiftable along said guide member to change the relative position of said units, wherein said at least one detent is resilient and is stressed in response to confinement in said socket so that said at least one detent tends to leave said socket and engage said detent engaging means to prevent uncoupling of said units upon relative shifting of said follower from said predetermined position.

3. The apparatus of claim 1, further comprising a guide member connected to the power train, and a follower connected to said second unit, said follower being at a certain relative position when such units are coupled and being shiftable along said guide member to change the relative position of said units, wherein said releasing means is provided on said guide member and includes a confining portion which is spaced apart from said at least one detent when said units are couple 4. The apparatus of claim 3, wherein said releasing means confining portion is disposed axially between the prime mover and said at least one detent 5. The apparatus of claim 1, wherein said releasing means is mounted on one of said units with freedom of movement relative to said unit and further comprising entraining means for entraining said releasing means into engagement with said at least one detent to confine said at least one detent in said socket in response to the relative shifting of said prime mover and power train to said predetermined position.

6. The apparatus of claim 5, wherein said releasing means includes a confining portion which engages said at least one detent and confines said at least one detent in said socket in said predetermined relative position of said prime mover and power train, when said prime mover and power train are assembled said confining portion and said entraining means are disposed between the prime mover and said at least one detent whereby said entraining means and the releasing means are axially spaced.

7. The apparatus of claim 5, further comprising means for biasing said releasing means toward said prime mover and against a stop of said one unit.

8. The apparatus of claim 7, wherein said releasing means is movable by said entraining means relative to said one unit and away from said stop against the opposition of said biasing means in response to shifting of said prime mover and power train to said relative predetermined position.

9. The apparatus of claim 1, further comprising a clutch plate having friction linings subject to wear as a result of engagement and disengagement of the clutch, a clutch operating element arranged to engage the clutch during relative movement of said units to a preselected position, said preselected position varying as a result of progressing wear upon said linings, said releasing means including a confining portion which confines said at least one detent in said socket in said relative predetermined position of said prime mover and power train but is spaced from said at least one detent in each preselected position of said clutch operating element to permit continued coupling of said engaging means and said detent.

10. The apparatus of claim 1, wherein said at least one detent includes a ring having a diameter which decreases in response to confinement in said socket, said ring tending to expand out of said socket in response to operation of the clutch.

11. The apparatus of claim 10, further comprising means for limiting the extent of expandability of said ring.

12. The apparatus of claim 10, wherein said ring bears against said engaging member when said units are coupled.

13. The apparatus of claim 10, wherein said ring is engageable by said releasing means in a partially expanded condition in which a portion of said ring projects from said socket, and further comprising means for limiting radial expansion of said ring to said partially expanded condition in response to uncoupling of said engaging means from said detent.

14. The apparatus of claim 1, wherein said socket is a ring-shaped groove and said at least one detent includes a split ring.

15. The apparatus of claim 14, wherein said ring is of wire.

16. The apparatus of claim 1, wherein said detent comprises a resilient ring.

17. The apparatus of claim 1, wherein said socket includes a ring-shaped groove on said one unit carrying said at least one detent and said one unit has a surface bounding said groove and including a substantially conical ramp tapering in a direction from the prime mover toward the power train.

18. The apparatus of claim 17, further comprising means for biasing said at least one detent against said ramp.

19. The apparatus of claim 18, wherein said at least one detent comprises a ring and said biasing means comprises at least one spring.

20. The apparatus of claim 1, wherein said at least one detent comprises a resilient ring and further comprising means for stressing said ring and for maintaining the ring in said socket upon uncoupling of said units from each other.

21. The apparatus of claim 20, wherein said ring tends to expand radially and said stressing means comprises a sleeve which surrounds and prevents radial expansion of said ring upon uncoupling of said units from each other.

22. The apparatus of claim 1, further comprising a guide member which defines a straight elongated path, a follower on said second unit and shiftable along said guide member to change the relative position of said units and said releasing means is fixedly connected with said guide member against movement in the longitudinal direction of said path.

23. The apparatus of claim 22, further comprising:
an antifriction having a first race rotatable with a clutch engaging and disengaging element of said first unit and a second race on said follower, and wherein said releasing means is provided on said first race.

24. The apparatus of claim 1, wherein said releasing means comprises a tubular member having a substantially U-shaped cross-sectional outline and including an inner collar and an outer collar arranged to confine said at least one detent in said socket in response to shifting of said prime mover and power train to said relative predetermined position.

25. The apparatus of claim 1, wherein said releasing means comprises a first tubular body and further comprising a guide member including a second tubular body coaxial with said first tubular body and having one end connected to said power train and another end which is remote from the power train, and further comprising means for connecting said first tubular body to said another end of said second tubular body to hold said first tubular body against axial movement relative to said second tubular body.

26. The apparatus of claim 3, further comprising a guide member connected to the power train, said one unit being shiftable along said guide member, wherein said releasing means is provided on said one unit and comprises at least one projection, said guide member comprising a stop which is engaged by said projection in response to shifting of said prime mover and power drain relative to each other.

27. The apparatus of claim 1, further comprising means for biasing said releasing means away from said at least one detent.

28. The apparatus of claim 1, further comprising a guide member on which said second unit is movable and means for releasably locking said second unit to said guide member.

29. The apparatus of claim 28, wherein said guide member comprises a tubular member having an axis, said locking means being disposed at a first radial distance from said axis and said coupling means being disposed at a greater second radial distance from said axis.

30. The apparatus of claim 1, further comprising a fluid-operated motor having a cylinder and a piston for operating the clutch, said at least one detent being provided on said piston.

31. The apparatus of claim 1, further comprising a tubular guide member along which said one unit is movable and a fluid-operated motor for and operating the clutch having a cylinder and a tubular piston surrounding and shiftable along said tubular guide member, said releasing means being provided on said guide member.

32. The apparatus of claim 1, further comprising a guide member along which a follower moves to operate the clutch means for releasably locking said second unit to said guide member, said locking means comprising a first part including a second detent and a second socket for said second detent, and a second part including a second detent engaging member, one of said parts being provided on said one unit and the other of said parts being provided on said guide member.

33. The apparatus of claim 32 further comprising a fluid-operated motor for operating said clutch having a cylinder and a piston reciprocable in said cylinder and constituting said follower, said first part being provided on said guide member and said second part being provided on said piston.

34. The apparatus of claim 32, further comprising means for confining said second detent in said second socket when said second detent engaging member is spaced apart from said second detent.

35. The apparatus of claim 34, wherein said second detent engaging member is resilient and is deformable by said piston in response to reengagement of said second detent by said second detent engaging member.

36. A clutch release apparatus for a pull-type clutch for use between a prime mover and a power train which is separably connectable to the prime mover, comprising:

a first component;

a diaphragm spring including a radially outer portion engageable with said first component and a radially inner portion engageable with a second component of the clutch;

a plurality of units including a first unit connectable with said diaphragm spring and a second unit having a follower shiftable along a guide member of the power train;

means for shifting said follower along said guide member;

a coupling having means for releasably connecting said first and second units to each other, said connecting means including at least one detent on one of said first and second units and a detent engaging member provided on the other of said first and second units to engage said at least one detent in a certain position of said and second unit relative to said guide member; and means for releasing said at least one detent for disengagement from said detent engaging member in response to shifting of said prime mover from the power train, said releasing means being actuated as said guide member moves relative to said second unit, said at least one detent being movable relative to said guide member in an axial direction to and from a position in which said at least one detent is movable by said guide member in a radial direction to become disengaged from said detent engaging member and to thus uncouple said first and second units from each other.

37. The apparatus of claim 36, wherein said first component comprises a clutch cover and said second component comprises an axially movable rotary pressure plate, said guide member being elongated and said follower being slidable along said guide member, said shifting means comprising a fork, said radially inner portion of said diaphragm spring including prongs having tips and further comprising means for connecting said first unit with said tips, said at least one detent including a ring which is movable radially relative to said guide member to become disengaged from said detent engaging member.

38. A clutch release apparatus for a pull-type clutch for use between a prime mover and a power train in a motor vehicle, the clutch having a clutch engaging/disengaging device comprising:

a first unit arranged to be mounted on the prime mover;

a second unit including an actuator having a fluid operated motor arranged to be mounted on the power train and including a first part and a second part reciprocable relative to said first part, an antifriction bearing between said device and said second part and including a first race rotatable with said device and a second race reciprocable with said second part, and means for connecting said first race to said device;

means for releasably coupling said units to each other, including at least one detent provided on one of said units and a detent engaging member provided on the other of said units for lockingly engaging said at least one detent in said detent engaging member so as to hold said first unit in a first predetermined position relative to said second unit to couple said units to each other;

means for releasing the locking engagement between said at least one detent and said detent engaging means in the course of separate said prime mover and power train from each other at predetermined positions; and means for releasably locking said second part in a preselected position of said parts relative to each other upon disassembly of said prime mover relative to said power train.

39. The apparatus of claim 38, wherein said first part includes a cylinder and said second part includes a piston which is reciprocable in said cylinder, said device comprising a diaphragm spring having prongs and said connecting means comprising means for connecting said first race to said prongs.

40. The apparatus of claim 38, wherein said units are automatically connected each other during assembly to the power train with the prime mover in said preselected axial position of said second part.

41. The apparatus of claim 40, wherein said preselected axial position of said second part is determined in such a way that, during assembly of the prime mover and the power train with each other, said at least one detent and said detent engaging member move relative to each other through a distance greater than the extent of movement of said units to be connected to each other.

42. The apparatus of claim 38, wherein said fluid operated motor is operable to unlock said second part.

43. The apparatus of claim 38, wherein said fluid operated motor is operable to engage said at least one detent with said detent engaging member.

44. The apparatus of claim 38, wherein said locking means comprises a second detent and a member for lockingly engaging said second detent in said preselected position of said second part.

45. The apparatus of claim 38, wherein said means for releasing further comprises means for automatically releasing said detent from said locking engagement during separation of the prime mover and the power train from each other, the extent of movement required of disconnection of the prime mover and the power train from each other and for operating said locking means being less than the extent of movement of the prime mover and the power train to disengage said units from each other.

46. The apparatus of claim 38, wherein said parts have a common axis, said locking means being disposed at a first radial distance from said axis and said coupling means being disposed at a greater second radial distance from said axis.

47. The apparatus of claim 38, wherein said power train comprises a guide member and said second part includes a piston of said fluid operated motor, said locking means including means for releasably locking said piston to said guide member.

48. The apparatus of claim 47, wherein said piston surrounds said guide member.

49. The apparatus of claim 38, wherein said second part includes a piston of said fluid operated motor, said detent being provided on said piston.

50. The apparatus of claim 38, wherein said power train comprises a guide member for said second part, said means for releasing the locking engagement of said at least one detent from said detent engaging member in response to movement of said second part relative to said guide member being provided on said guide member.

51. The apparatus of claim 38, wherein said locking means comprises a second socket, a second detent in said second socket, and a second detent engaging member which engages said detent in said preselected position of said parts relative to each other.

52. The apparatus of claim 51, wherein said power train comprises a guide member for said second part, said second socket and said second detent being provided on said guide member and said second detent engaging member being provided on said second part.

53. The apparatus of claim 51, further comprising means for confining said second detent in said second socket in response to movement of said parts from said preselected position relative to each other.

54. The apparatus of claim 53, wherein said confining means is resilient and is deformable by said second part.

* * * * *